(12) United States Patent
Fukuhara

(10) Patent No.: US 8,953,898 B2
(45) Date of Patent: Feb. 10, 2015

(54) IMAGE PROCESSING APPARATUS AND METHOD

(75) Inventor: Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 13/393,935

(22) PCT Filed: Jul. 1, 2011

(86) PCT No.: PCT/JP2011/065208
§ 371 (c)(1),
(2), (4) Date: Mar. 2, 2012

(87) PCT Pub. No.: WO2012/005193
PCT Pub. Date: Jan. 12, 2012

(65) Prior Publication Data
US 2012/0163725 A1    Jun. 28, 2012

(30) Foreign Application Priority Data

Jul. 9, 2010   (JP) ............................... P2010-156708

(51) Int. Cl.
| | |
|---|---|
| *G06K 9/36* | (2006.01) |
| *G06K 9/46* | (2006.01) |
| *H04N 19/70* | (2014.01) |
| *H04N 19/597* | (2014.01) |
| *H04N 19/64* | (2014.01) |

(52) U.S. Cl.
CPC ... *H04N 19/00884* (2013.01); *H04N 19/00769* (2013.01); *H04N 19/0083* (2013.01)
USPC ....................... 382/240; 375/240.24; 382/236

(58) Field of Classification Search
USPC ........... 375/240.12, 240.15, 240.16; 382/232, 382/233, 235, 240
See application file for complete search history.

(56) References Cited

U.S. PATENT DOCUMENTS

| | | | | |
|---|---|---|---|---|
| 6,055,012 | A * | 4/2000 | Haskell et al. | 348/48 |
| 7,110,608 | B2 * | 9/2006 | Chan et al. | 382/239 |
| 8,320,456 | B2 * | 11/2012 | Koo et al. | 375/240.16 |

(Continued)

FOREIGN PATENT DOCUMENTS

| | | |
|---|---|---|
| EP | 2 330 587 | 6/2011 |
| JP | 2004-40351 | 2/2004 |
| JP | 2007-27816 | 2/2007 |
| JP | 2010 87904 | 4/2010 |
| WO | WO 2010/038337 | 4/2010 |

OTHER PUBLICATIONS

Office Action issued in corresponding Chinese application No. 201180003681.1 issued Nov. 15, 2014 and the English Translation.

*Primary Examiner* — Gregory M Desire
(74) *Attorney, Agent, or Firm* — Frommer Lawrence & Haug LLP; William S. Frommer

(57) ABSTRACT

The present invention relates to an image processing apparatus and method configured to make it possible to improve the convenience of codestreams in which multiview images are encoded.
A progression determining unit 183 determines a progressive structure for a merged codestream on the basis of analysis results for progressive structures of input codestreams 112 for respective views and externally supplied progressive structure instructions. A merging unit 184 merges the codestreams according to the determination so as to have the progressive structure. A progression information generator 185 generates progression information for the merged codestream 194, and embeds it at a given position. The present invention can be applied to an image processing apparatus, for example.

24 Claims, 36 Drawing Sheets

(56) References Cited

U.S. PATENT DOCUMENTS

| | | | |
|---|---|---|---|
| 2004/0175059 A1* | 9/2004 | Willner et al. | 382/305 |
| 2005/0036695 A1* | 2/2005 | Yano et al. | 382/232 |
| 2007/0041443 A1* | 2/2007 | Ha et al. | 375/240.15 |
| 2007/0121722 A1* | 5/2007 | Martinian et al. | 375/240.12 |
| 2007/0177813 A1* | 8/2007 | Yang | 382/233 |
| 2009/0268816 A1* | 10/2009 | Pandit et al. | 375/240.12 |
| 2010/0020966 A1* | 1/2010 | Hata et al. | 380/44 |
| 2010/0322311 A1* | 12/2010 | Vetro et al. | 375/240.12 |

\* cited by examiner

CODE BLOCK (EX.) 64 × 64

FIG. 14

| Parameters | Size (bits) | Values | Meaning of SGcod values |
|---|---|---|---|
| Progression order | 8 | Table A-16 | Progression order |
| Number of layers | 16 | 1-65,535 | Number of layers |
| Multiple component transformation | 8 | Table A-17 | Multiple component transformation usage |

FIG. 15

| Values MSB   LSB | Progression order |
|---|---|
| 0000 0000 | Layer -resolution level -component -position progression |
| 0000 0001 | Resolution level -layer -component -position progression |
| 0000 0010 | Resolution level -position -component -layer progression |
| 0000 0011 | Position -component -resolution level -layer progression |
| 0000 0100 | Component -position -resolution level -layer progression |
|  | All other values reserved |

FIG. 20

| Values MSB LSB | Progression order |
|---|---|
| 0001 0000 | View -layer -resolution level -component -position progression |
| 0010 0000 | Layer -view -resolution level -component -position progression |
| 0001 0001 | View -resolution level -layer -component -position progression |
| 0010 0001 | Resolution level -view -layer -component -position progression |
| 0001 0010 | View -resolution level -position -component -layer progression |
| 0010 0010 | Resolution level -position -view -component -layer progression |
| 0001 0011 | View -position -component -resolution level -layer progression |
| 0010 0011 | Position -view -component -resolution level -layer progression |
| 0001 0100 | View -component -position -resolution level -layer progression |
| 0010 0100 | Component -view -position -resolution level -layer progression |
| | All other values reserved |

FIG. 21

| Values MSB　　LSB | Capability |
|---|---|
| 0000 0000 0000 0000 | Capabilities specified in this Recommendation \| International Standard only |
| 0000 0000 0000 0001 | Codestream restricted as described for Profile 0 from Table A-45 |
| 0000 0000 0000 0010 | Codestream restricted as described for Profile 1 from Table A-45 |
| | All other values reserved |

FIG. 22

| Values<br>MSB        LSB | Capability |
|---|---|
| 0000 0000 0000 0000 | Capabilities specified in this Recommendation \| International Standard only |
| 0000 0000 0000 0001 | Codestream restricted as described for Profile 0 from Table A-45 |
| 0000 0000 0000 0010 | Codestream restricted as described for Profile 1 from Table A-45 |
| 0000 0000 0010 xxxx<br>~ 1111 1111 1111 xxxx | Codestream specified for the number of view<br>(2 ~ 4,096) |
| | All other values reserved |

IMAGE PROCESSING APPARATUS AND METHOD

TECHNICAL FIELD

The present invention relates to an image processing apparatus and method, and more particularly, to an image processing apparatus and method configured to make it possible to improve the convenience of codestreams in which multiview images are encoded.

BACKGROUND ART

Recently, movies supporting stereoscopy (also called 3D image display) have been proliferating. For example, movies capable of 3D display (also called 3D movies) have come to be actively produced and becoming largely differentiated from movies only capable of traditional 2D display (also called 2D movies). In the case of a 3D movie, the content (image data, etc.) is efficiently compressed according to the MVC (Multiview Video Coding) amendment to the MPEG-4 AVC format and recorded to a recording medium such as a Blu-ray Disc (registered trademark).

A user is able to enjoy 3D movies at home by playing back the content with a consumer Blu-ray Disc player and viewing it while wearing stereoscopic glasses (also called 3D glasses).

Such 3D movies and other stereoscopic content (3D content) is rapidly proliferating. The prevailing images in 3D content are stereo images that utilize the binocular parallax of human eyes. Such images cause a user to perceive parallax and perceive a subject three-dimensionally by separately showing a left-eye image and a right-eye image to a user's respective eyes.

However, with stereoscopy using binocular parallax discussed above, stereoscopy from arbitrary directions cannot be realized. Realizing this requires extracting depth data (a depth_map) from a subject image.

Research on automatically extracting rough depth information from image data using image processing/analysis technology is being vigorously conducted (see NPL 1 and NPL 2, for example). Such technology, as well as technology allowing comparatively easy extraction of depth information for subjects in an images from a plurality of cameras, provides a foothold whereby stereoscopic images can be generated from not only binocular view points but also from a plurality of free view points.

However, although there is a limit to the fundamental amount of data for binocular stereo images, totaling image data for plural view points and their depth data yields an enormous amount of data. Consequently, it becomes important to compress such data as efficiently as possible.

For example, in the case of stereo images, there are two encoded codestreams generated by encoding respective left- and right-view images. Similarly, in the case of multiview, there exist a number of encoded codestreams equal to the number of views. Thus, merging these multiple codestreams into a single encoded codestream has been considered as one method. In so doing, the coding efficiency can be improved.

Meanwhile, JPEG 2000 is an ISO international standard for still images which is not only implemented as a digital cinema standard codec, but it also broadly used for security, archiving, medical imaging, broadcasting, etc. One of JPEG 2000's abundant functions is scalability. This function divides a single encoded codestream into a plurality of streams belonging to the same category. As a result, by rearranging the progression (order) in the encoded codestream, scalability of resolution and image quality, etc. (decoded image scalability) can be realized. Consequently, it becomes possible to use codestreams in more varied applications, thus improving the convenience of codestreams.

CITATION LIST

Non Patent Literature

NPL 1: "Fast Approximate Energy Minimization via Graph Cuts," IEEE Transactions on Pattern Analysis and Machine Intelligence, Vol. 23, No. 11, November 2001.

NPL 2: "Stereo Matching Using Belief Propagation," IEEE Transactions on Pattern Analysis and Machine Intelligence, Vol. 25, No. 7, July 2003.

SUMMARY OF INVENTION

Technical Problem

However, a progression, which is a data structure for realizing decoded image scalability, has not been defined for the case of merging multiview codestreams. Consequently, in the case of merging multiview codestreams to generate a single codestream, there has been a risk that the progressive function cannot be used and codestream convenience cannot be improved.

The present invention, being proposed in light of such circumstances, takes as an object to make it possible to improve the convenience of codestreams in which multiview images are encoded by defining a progression for the case of encoding multiview images and generating a single codestream.

Solution to Problem

An aspect of the present invention is an image processing apparatus provided with analyzing means for analyzing a progressive structure, i.e. a data structure for realizing decoded image scalability, possessed by multiview codestreams in which images are encoded, determining means for determining a merged progressive structure for the multiview codestreams according to analysis results given by the analyzing means, and merging means for merging the multiview codestreams according to the merged progressive structure determined by the determining means, and generating a single codestream having the progressive structure.

The codestreams may have a progressive structure with respect to layers, resolution levels, components, and positions.

The determining means may determine the merged progressive structure such that a progressive structure with respect to views is added to the progressive structure analyzed by the analyzing means.

In the case where the progressive structure analyzed by the analyzing means has a tiered structure in the order of layers, resolution levels, components, and positions, the determining means may take the merged progressive structure to be a tiered structure in the order of views, layers, resolution levels, components, and positions.

In the case where the progressive structure analyzed by the analyzing means has a tiered structure in the order of layers, resolution levels, components, and positions, the determining means may take the merged progressive structure to be a tiered structure in the order of layers, views, resolution levels, components, and positions.

In the case where the progressive structure analyzed by the analyzing means has a tiered structure in the order of resolution levels, layers, components, and positions, the determining means may take the merged progressive structure to be a tiered structure in the order of views, resolution levels, layers, components, and positions.

In the case where the progressive structure analyzed by the analyzing means has a tiered structure in the order of resolution levels, layers, components, and positions, the determining means may take the merged progressive structure to be a tiered structure in the order of resolution levels, views, layers, components, and positions.

In the case where the progressive structure analyzed by the analyzing means has a tiered structure in the order of resolution levels, positions, components, and layers, the determining means may take the merged progressive structure to be a tiered structure in the order of views, resolution levels, positions, components, and layers.

In the case where the progressive structure analyzed by the analyzing means has a tiered structure in the order of resolution levels, positions, components, and layers, the determining means may take the merged progressive structure to be a tiered structure in the order of resolution levels, positions, views, components, and layers.

In the case where the progressive structure analyzed by the analyzing means has a tiered structure in the order of positions, components, resolution levels, and layers, and positions, the determining means may take the merged progressive structure to be a tiered structure in the order of views, positions, components, resolution levels, and layers.

In the case where the progressive structure analyzed by the analyzing means has a tiered structure in the order of positions, components, resolution levels, and layers, the determining means may take the merged progressive structure to be a tiered structure in the order of positions, views, components, resolution levels, and layers.

In the case where the progressive structure analyzed by the analyzing means has a tiered structure in the order of components, positions, resolution levels, and layers, the determining means may take the merged progressive structure to be a tiered structure in the order of views, components, positions, resolution levels, and layers.

In the case where the progressive structure analyzed by the analyzing means has a tiered structure in the order of components, positions, resolution levels, and layers, the determining means may take the merged progressive structure to be a tiered structure in the order of components, views, positions, resolution levels, and layers.

The image processing apparatus may be additionally provided with progression information generating means for generating progression information, i.e. information regarding the merged progressive structure, and adding it to the codestream.

The progression information generating means may define as the progression information a tiered structure for the merged progressive structure in at least one of SGcod, SPcoc, and Ppoc in a JPEG 2000 COD marker segment included in the merged codestream.

The progression information generating means may define as the progression information the number of views in the codestreams merged by the merging means in Rsiz in a JPEG 2000 SIZ marker segment included in the merged codestream.

The image processing apparatus may be additionally provided with instructions receiving means for receiving external instructions regarding the progressive structure, wherein the determining means determines the merged progressive structure according to analysis results given by the analyzing means and the external instructions received by the instructions receiving means.

The image processing apparatus may be additionally provided with encoding means for encoding the images for respective views so as to have the progressive structure, wherein the analyzing means analyzes the progressive structure of the codestreams for respective views which have been generated by the encoding means encoding the images.

The image processing apparatus may be additionally provided with depth data generating means for generating depth data indicating image depths from the images for respective views, wherein the encoding means additionally encodes the depth data generated by the depth data generating means, and the merging means merges a codestream of the depth data generated by the encoding means together with other multiview codestreams as a single codestream.

An aspect of the present invention is an image processing method for an image processing apparatus, in which analyzing means analyzes a progressive structure, i.e. a data structure for realizing decoded image scalability, possessed by multiview codestreams in which images are encoded, determining means determines a merged progressive structure for the multiview codestreams according to analysis results, and merging means merges the multiview codestreams according to the determined merged progressive structure, and generates a single codestream having the progressive structure.

Another aspect of the present invention is an image processing apparatus provided with analyzing means for analyzing a progressive structure, i.e. a data structure for realizing decoded image scalability, possessed by a single codestream which has been generated by merging multiview codestreams in which images are encoded, and splitting means for splitting the merged, single codestream into the multiview codestreams according to a progressive structure with respect to views which is included in the progressive structure analyzed by the analyzing means.

The image processing apparatus may be additionally provided with decoding means for decoding the codestreams for respective views which have been split by the splitting means.

The image processing apparatus may be additionally provided with progression information generating means for generating progression information, i.e. information regarding the progressive structure, for the codestreams for respective views which have been split by the splitting means, and adding it to the codestreams.

The merged, single codestream may have a progressive structure with respect to views, layers, resolution levels, components, and positions.

Another aspect of the present invention is an image processing method for an image processing apparatus, in which analyzing means analyzes a progressive structure, i.e. a data structure for realizing decoded image scalability, possessed by a single codestream which has been generated by merging multiview codestreams in which images are encoded, and splitting means splits the merged, single codestream into the multiview codestreams according to a progressive structure with respect to views which is included in the analyzed progressive structure.

In an aspect of the present invention, a progressive structure, i.e. a data structure for realizing decoded image scalability, possessed by multiview codestreams in which images are encoded is analyzed, a merged progressive structure is determined for the multiview codestreams according to the analysis results, the multiview codestreams are merged according to the determined merged progressive structure, and a single codestream having the progressive structure is generated.

In another aspect of the present invention, a progressive structure, i.e. a data structure for realizing decoded image scalability, possessed by a single codestream which has been generated by merging multiview codestreams in which images are encoded is analyzed, and the merged, single codestream is split into the multiview codestreams according to a progressive structure with respect to views which is included in the analyzed progressive structure.

Advantageous Effects of Invention

According to the present invention, images can be processed. More particularly, the convenience of codes streams in which multiview images are encoded can be improved.

BRIEF DESCRIPTION OF DRAWINGS

FIG. 14 is a diagram explaining JPEG 2000 SGcod parameters.

FIG. 15 is a diagram illustrating exemplary JPEG 2000 progression order parameters.

FIG. 20 is a diagram illustrating an exemplary progression order extension.

FIG. 21 is a diagram explaining JPEG 2000 capability R size parameter definitions.

FIG. 22 is a diagram explaining an exemplary method of defining the number of views to which the present invention has been applied.

DESCRIPTION OF EMBODIMENTS

Hereinafter, embodiments for carrying out the invention (hereinafter designated embodiments) will be described. The description will proceed in the following order.

1. First embodiment (image encoding apparatus)
2. Second embodiment (image decoding apparatus)
3. Third embodiment (image encoding apparatus)
4. Fourth embodiment (network system)
5. Fifth embodiment (personal computer)

1. First Embodiment

[Image Encoding Apparatus Configuration]

Figure 1:
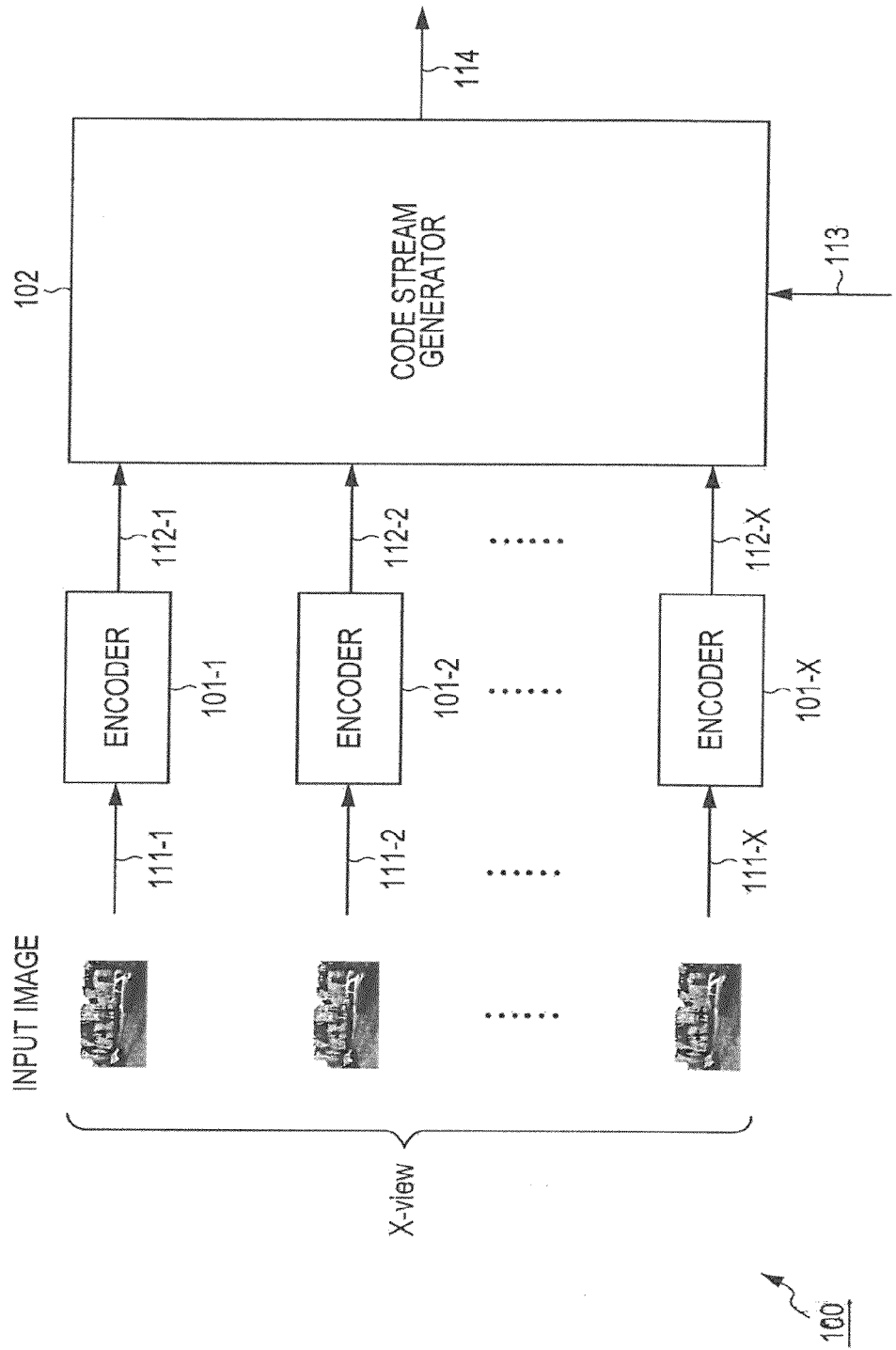
FIG. 1 is a block diagram illustrating an exemplary primary configuration of an image encoding apparatus to which the present invention has been applied.

FIG. 1 is a block diagram illustrating an exemplary primary configuration of an image encoding apparatus to which the present invention has been applied.

The image encoding apparatus 100 illustrated in FIG. 1 includes a plurality of inputs (multiview input), generates codestreams by respectively encoding multiview image data input into the respective inputs, and additionally merges those codestreams to generate a single codestream. At this point, the image encoding apparatus 100 generates a codestream having progressive functions for realizing decoded image scalability, such as in JPEG 2000 (Joint Photographic Experts Group 2000). In other words, the image encoding apparatus 100 generates a highly convenient codestream that is usable in more varied applications.

As illustrated in FIG. 1, the image encoding apparatus 100 accepts image data for X views. The image encoding apparatus 100 includes encoders 101-1 to 101-X, as well as a codestream generator 102.

The encoders 101-1 to 101-X respectively encode input image data for X views (input image data 111-1 to 111-X) and generated X codestreams (codestreams 112-1 to 112-X).

The codestream generator 102 accepts the output from the encoders 101-1 to 101-X (the codestreams 112-1 to 112-X), and merges them on the basis of external instructions 113 to generate and output a single codestream (a codestream 114).

Hereinafter, the encoders 101-1 to 101-X will be simply designated the encoders 101 in cases where it is not necessary to individually distinguish them. Also, the input image data 111-1 to 111-X will be simply designated the input image data 111 in cases where it is not necessary to individually distinguish them. Furthermore, the codestreams 112-1 to 112-X will be simply designated the codestreams 112 in cases where it is not necessary to individually distinguish them.

As discussed later, the respective encoders 101 generate codestreams 112 such that they have a progressive structure, which is a data structure for realizing decoded image scalability, with respect to image quality and resolution, etc. The codestream generator 102 generates, on the basis of external instructions 113, a codestream 114 such that it has, in addition to the progressive structure included in the codestreams 112, a progressive structure for multiview (a data structure realizing multiview-related scalability, or in other words, a data structure making it possible to control which views to decode and in what order, etc.).

Although the encoders 101 are described as being provided for individual views in the foregoing, it may also be configured such that a single encoder 101 is able to respectively encode input image data 111 for a plurality of views. For example, the image encoding apparatus 100 may be configured to include one encoder 101, and that encoder 101 may be configured to respectively encode input image data 111 for X views and generate codestreams for X views.

[Encoder Configuration]

Figure 2:
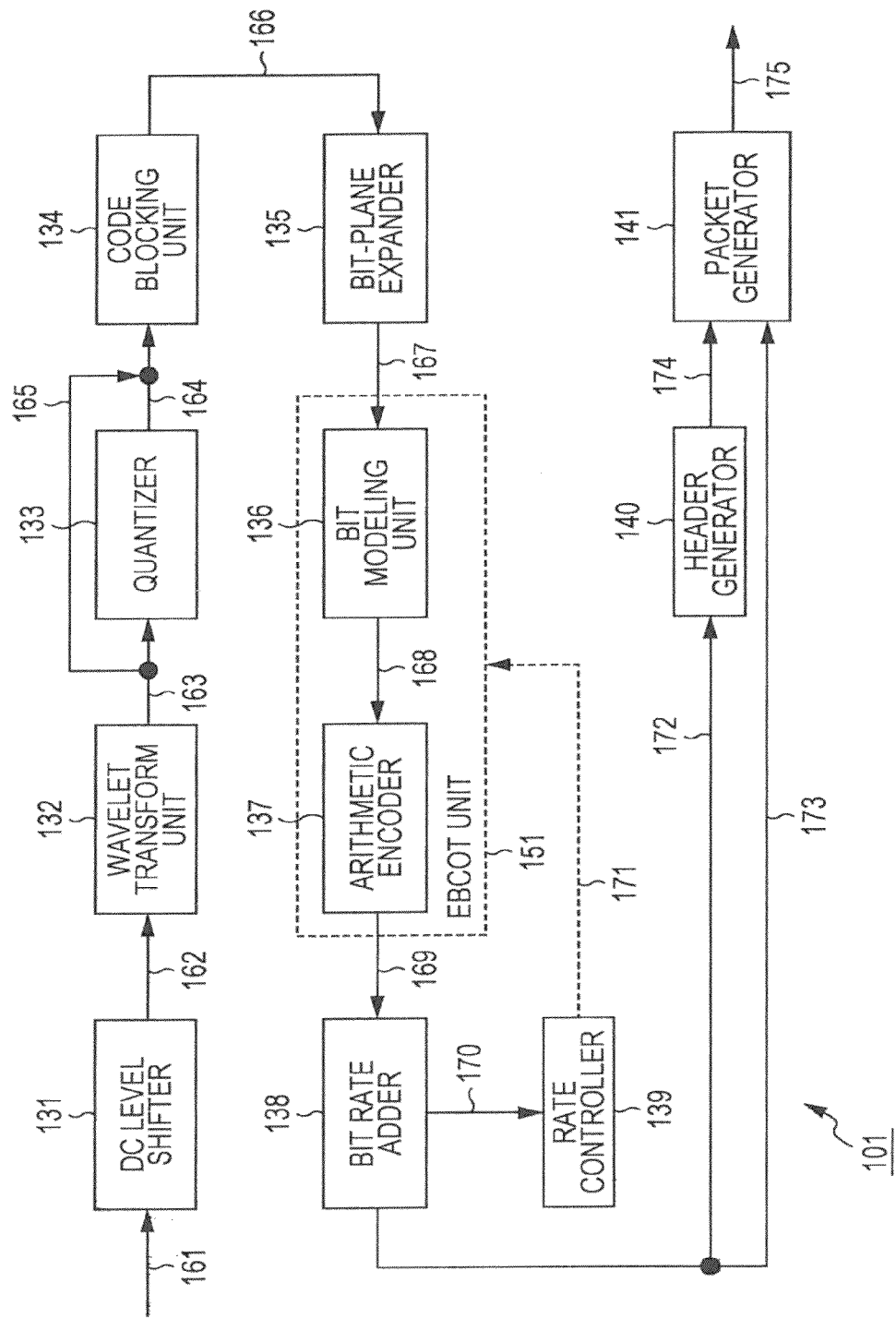
FIG. 2 is a block diagram illustrating an exemplary primary configuration of an encoder.

FIG. 2 is a block diagram illustrating an exemplary primary configuration of an encoder 101 in FIG. 1. The encoder 101 is an encoder which encodes so as to generate a codestream having a progressive structure similar to the JPEG 2000 format. It may also be configured such that the encoder 101 encodes images according to the JPEG 2000 format.

As illustrated in FIG. 2, the encoder 101 includes a DC level shifter 131, a wavelet transform unit 132, a quantizer 133, a code blocking unit 134, and a bit-plane expander 135.

The DC level shifter 131 level-shifts the DC components of image data input into the encoder 101 as indicated by the arrow 161 (the input image data 111 in FIG. 1) in order to efficiently conduct the subsequent wavelet transform. For example, an RGB signal has positive values (unsigned integers). Thus, the DC level shifter 131 utilizes this fact and conducts level shifting that halves the dynamic range of the original signal, thereby attempting to improve the compression rate. Consequently, such level shifting is not conducted in the case where the original signal is taken to be a signal having signed (both positive and negative) integer values, as in the chroma data Cb and the chroma data Cr of a YCbCr signal.

The wavelet transform unit 132 is realized by a filter bank composed of ordinary low-pass filters and high-pass filters. Also, since digital filters ordinarily have impulse response equal to their multiple taps (filter coefficients), the wavelet transform unit 132 includes a buffer that pre-buffers as many input images as can be filtered.

Once the wavelet transform unit 132 acquires at least the minimum necessary amount of data for filtering from the image data output by the DC level shifter 131 as indicated by the arrow 162, the wavelet transform unit 132 filters the DC level-shifted image data using a given wavelet transform filter, and generates wavelet coefficients. Herein, the wavelet transform unit 132 conducts filtering which separates image data into low-pass components and high-pass components, and which is respectively conducted in the vertical direction and the horizontal direction of the image.

Then, the wavelet transform unit 132 recursively repeats such a filtering process a given number of times on the subbands which are separated out as the low-pass components in both the vertical direction and the horizontal direction. This is because most of an image's energy is concentrated in the low-pass components, as illustrated in FIG. 3, for example.

Figure 3:
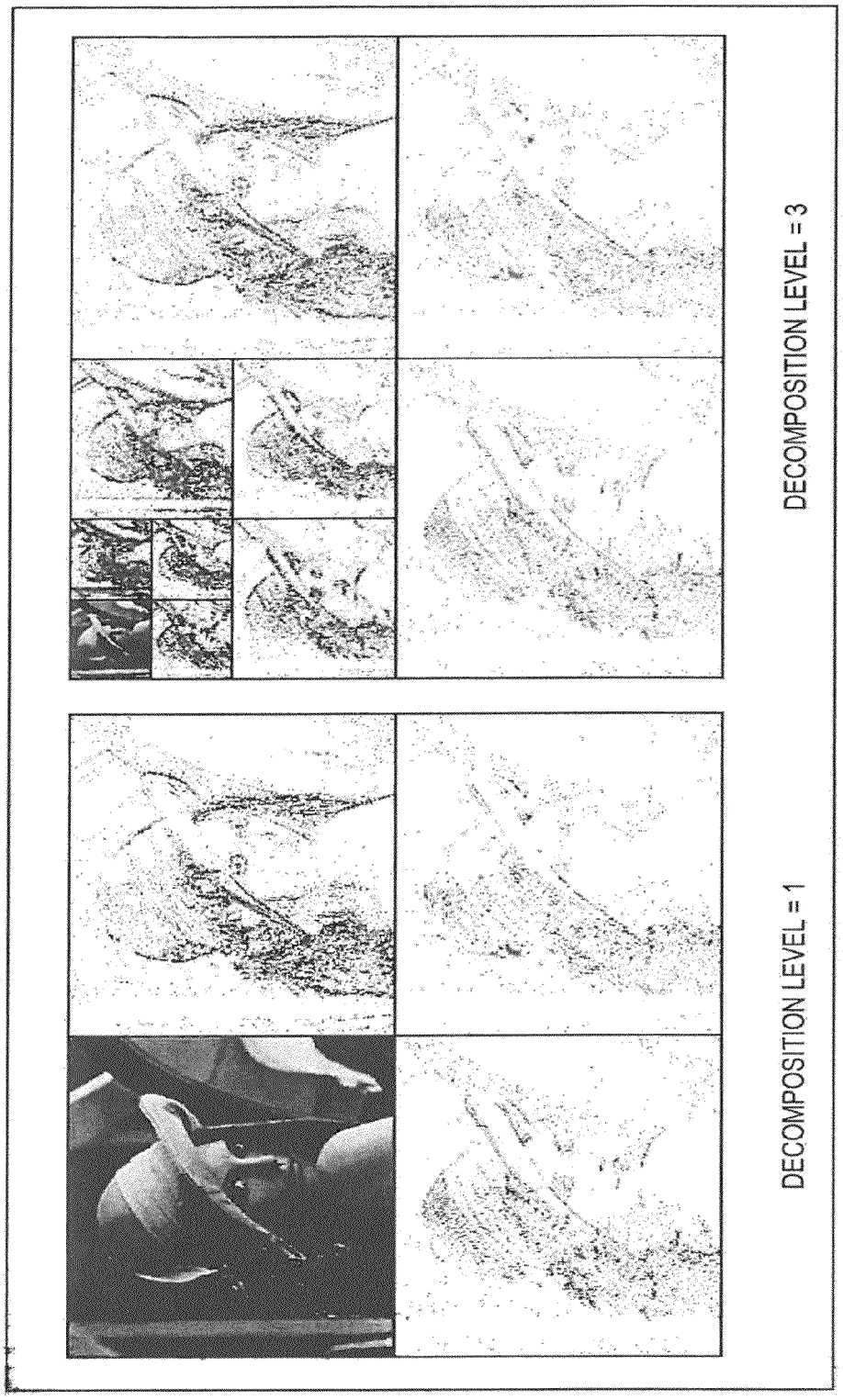
FIG. 3 is a diagram illustrating an exemplary subband configuration.

FIG. 3 is a diagram illustrating an exemplary subband configuration. As illustrated in FIG. 3, most of the image's energy is concentrated in the low-pass components whether in a state of decomposition level 1 or in a state of decomposition level 3.

Figure 4:
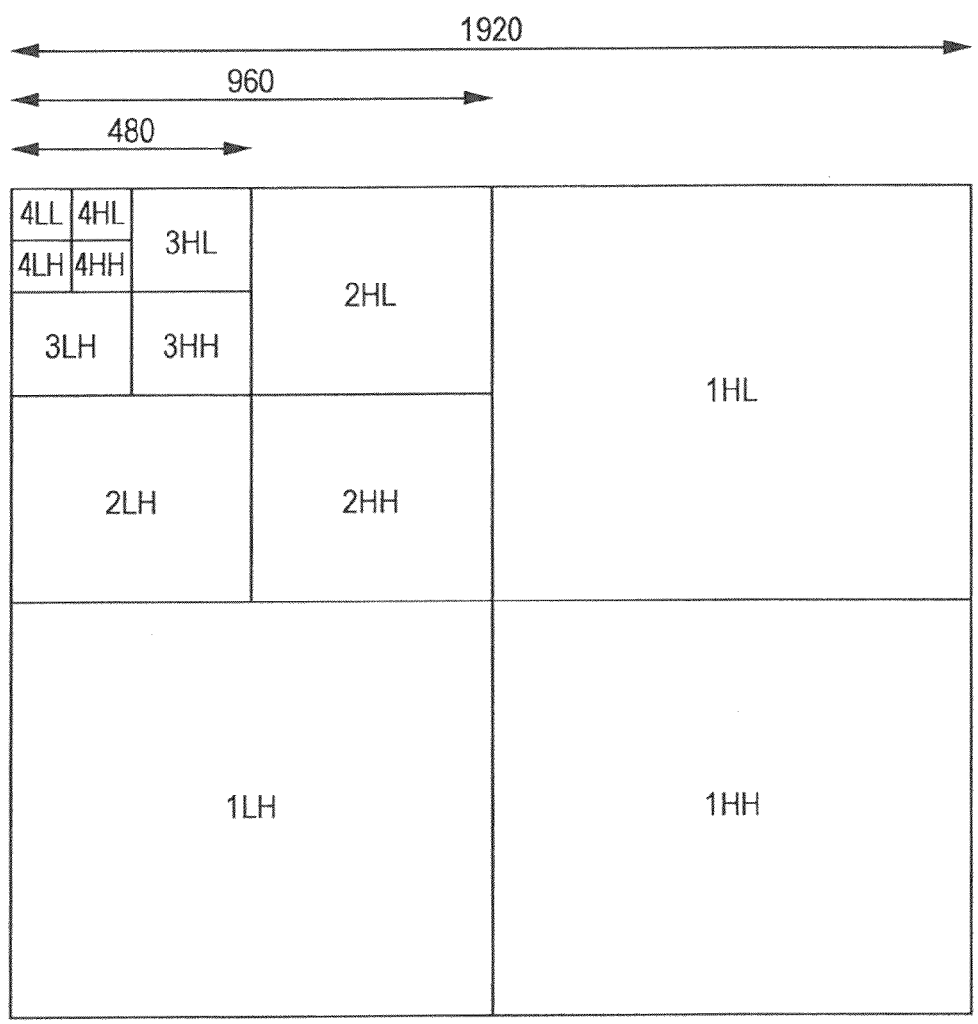
FIG. 4 is a diagram illustrating an exemplary subband configuration.

FIG. 4 is a diagram illustrating an exemplary configuration of subbands generated by a wavelet transform process with decomposition level 4.

In this case, the wavelet transform unit 132 first filters the entire image and generates the subbands 1LL (not illustrated), 1HL, 1LH, and 1HH. Next, the wavelet transform unit 132 conducts filtering again on the generated subband 1LL, and generates the subbands 2LL (not illustrated), 2HL, 2LH, and 2HH. Additionally, the wavelet transform unit 132 conducts filtering once again on the generated subband 2LL, and generates 3LL, 3HL, 3LH, and 3HH. Additionally, the wavelet transform unit 132 conducts filtering once again on the generated subband 3LL, and generates 4LL, 4HL, 4LH, and 4HH.

In this way, 13 subbands are generated when conducting analysis filtering up to decomposition level 4. As illustrated in FIG. 4, each time the decomposition level increases by 1, the sizes of the subbands are respectively halved in the vertical direction and the horizontal direction.

In other words, if a single pass of analysis filtering is applied to baseband image data for an image having 1920 pixels horizontally, for example, four subbands having 960 pixels horizontally (1LL, 1HL, 1LH, 1HH) are generated. Additionally, if a single pass of analysis filtering is applied to the subband 1LL, four subbands having 480 pixels horizontally (2LL, 2HL, 2LH, 2HH) are generated. Additionally, if pass analysis filtering is applied to the subband 2LL, four subbands having 240 pixels horizontally (3LL, 3HL, 3LH, 3HH) are generated. Additionally, if a single pass of analysis filtering is applied to the subband 3LL, four subbands having 120 pixels horizontally (4LL, 4HL, 4LH, 4HH) are generated.

However, the number of decomposition levels in a wavelet transform is arbitrary.

The wavelet transform unit 132 supplies the wavelet coefficients obtained by filtering for each subband to the quantizer 133, as indicated by the arrow 163. The quantizer 133 quantizes the supplied wavelet coefficients. The quantization method is arbitrary, but scalar quantization that divides by a quantization step size is typical. The quantizer 133 supplies the quantized coefficients obtained by quantization to the code blocking unit 134, as indicated by the arrow 164. At this point, quantized coefficients are supplied instead of wavelet coefficients in subsequent stages, but the quantized coefficients are still basically handled in the same way as in the case of wavelet coefficients. Consequently, explanation of this point will be omitted hereinafter unless necessary, and quantized coefficients will be simply called coefficients or coefficient data.

Meanwhile, in the case where the encoder 101 encodes image data according to a lossless coding format whereby the original data is completely recoverable by the decoding process, the processing of the quantizer 133 is omitted, and the output from the wavelet transform unit 132 is supplied to the code blocking unit 134 as indicated by the arrow 165.

Figure 5:
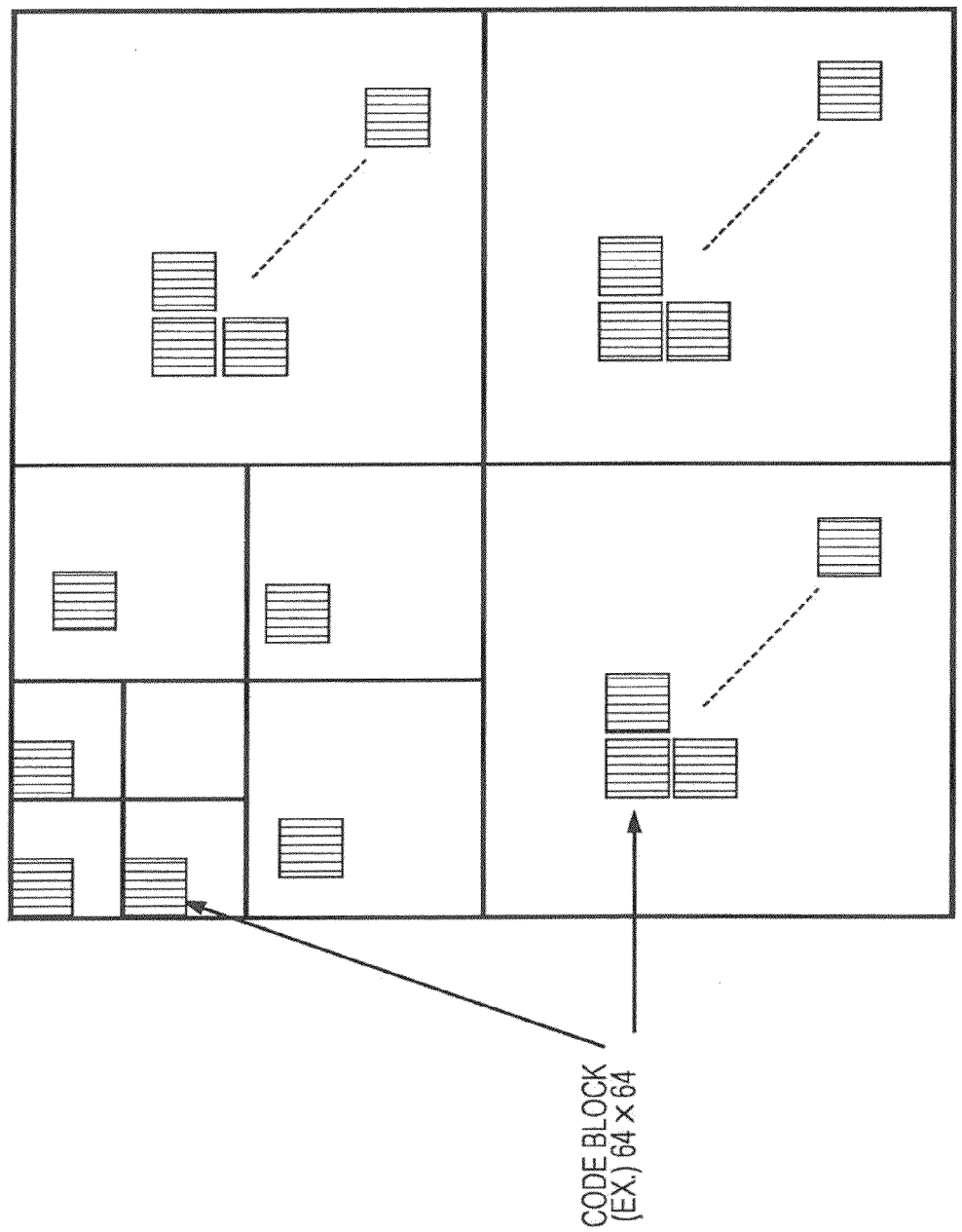
FIG. 5 is a diagram illustrating code-blocks in respective subbands.

At the code blocking unit 134, the wavelet coefficients are divided into code-blocks of a given size, which are the processing units for entropy coding. FIG. 5 illustrates the positional relationships of code-blocks in each subband. For example, code-blocks having a size of approximately 64×64 pixels are generated in all decomposed subbands. The subsequent, respective processing unit process these code-blocks individually.

The code blocking unit 134 supplies the respective code-blocks to the bit-plane expander 135, as indicated by the arrow 166. The bit-plane expander 135 expands the coefficient data into individual bit-planes according to bit significance.

Bit-planes are obtained by taking a coefficient group consisting of a given number of wavelet coefficients, and dividing (slicing) it on a per-bit basis, i.e. by bit significance. In other words, a bit-plane is a collection of the bits (coefficient bits) having the same significance in the coefficient group.

Figure 6:
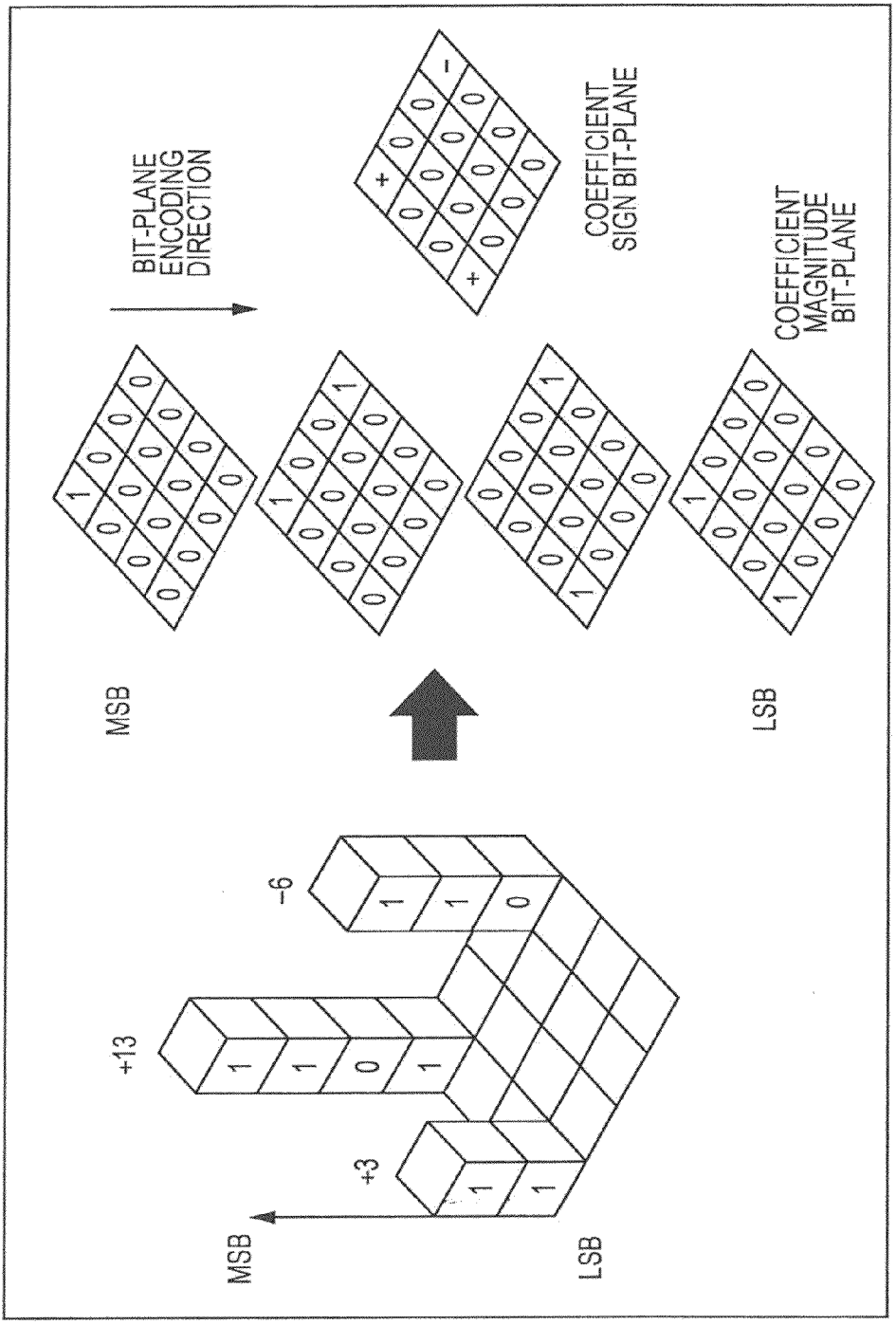
FIG. 6 is a diagram explaining an exemplary bit-plane.

FIG. 6 illustrates a specific example of this. The left side of FIG. 6 illustrates four coefficients horizontally and vertically, for a total of 16. Among these 16 coefficients, the one with the largest magnitude is 13, which is expressed as 1101 in binary. The bit-plane expander 135 expands such a coefficient group into four bit-planes expressing magnitude (magnitude bit-planes) and one bit-plane expressing sign (sign bit-plane). In other words, the coefficient on the left side of FIG. 6 is expanded into four magnitude bit-planes and one sign bit-plane, as illustrated on the right side of FIG. 6. Herein, elements in the magnitude bit-planes all take a value of 0 or 1. Also, elements in the bit-plane expressing sign take one among a value indicating that the coefficient value is positive, a value indicating that the coefficient value is 0, and a value indicating that the coefficient value is negative.

The encoder 101 additionally includes a bit modeling unit 136, an arithmetic encoder 137, a bit rate adder 138, a rate controller 139, a header generator 140, and a packet generator 141.

The bit-plane expander 135 supplies the expanded bit-planes to the bit modeling unit 136, as indicated by the arrow 167.

The bit modeling unit 136 and the arithmetic encoder 137 act as an EBCOT (Embedded Coding with Optimized Truncation) unit 151, and perform entropy encoding called EBCOT which is defined in the JPEG 2000 standard on the input coefficient data. EBCOT is a technique that encodes individual blocks of a given size while measuring the total bit rate for the coefficients in those blocks.

The bit modeling unit 136 conducts bit modeling on coefficient data following the procedure defined in the JPEG 2000 standard, and supplies information such as control information, symbols, and context information to the arithmetic encoder 137, as indicated by the arrow 168. The arithmetic encoder 137 arithmetically encodes the coefficient bit-planes.

The horizontal and vertical size of code-blocks is a power of 2 from 4 to 256, with commonly used sizes being 32×32, 64×64, and 128×32, etc. Coefficient values are expressed as signed binary numbers of n bits, with bit0 to bit(n−2) representing the respective bits from the LSB to the MSB. The remaining bit expresses the sign. Encoding of a code-block is conducted by the following three encoding passes applied in order starting from the MSB bit-plane.

(1) Significant Propagation Pass
(2) Magnitude Refinement Pass
(3) Cleanup Pass

Figure 7:
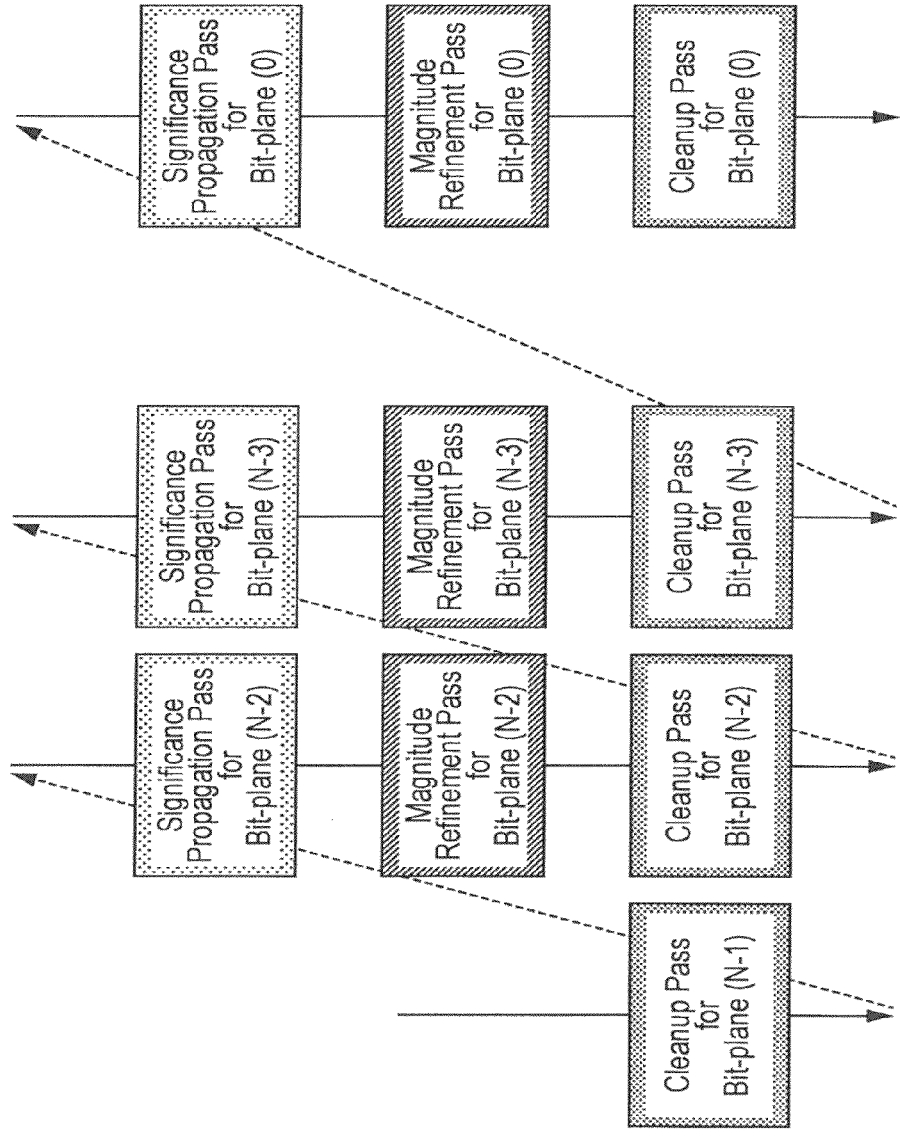
FIG. 7 is a diagram explaining exemplary encoding passes.

The sequence in which the three encoding passes are used is illustrated in FIG. 7. First, bit-plane(n−1) (MSB) is encoded by a cleanup pass. Subsequently, encoding of the respective bit-planes is successively conducted while heading towards the LSB and using the three encoding passes in the order of significant propagation pass, magnitude refinement pass, and cleanup pass.

In practice, however, the nth bit-plane starting from the MSB where a 1 first appears is written in the header, and consecutive all-0 bit-planes (designated zero bit-planes) starting from the MSB are not encoded. In this sequence, the three encoding passes in this sequence are repeatedly used to encode, and by truncating the encoding at an arbitrary encoding pass of an arbitrary bit-plane, a trade-off between bit rate and image quality is taken (i.e., rate control is conducted).

Figure 8:
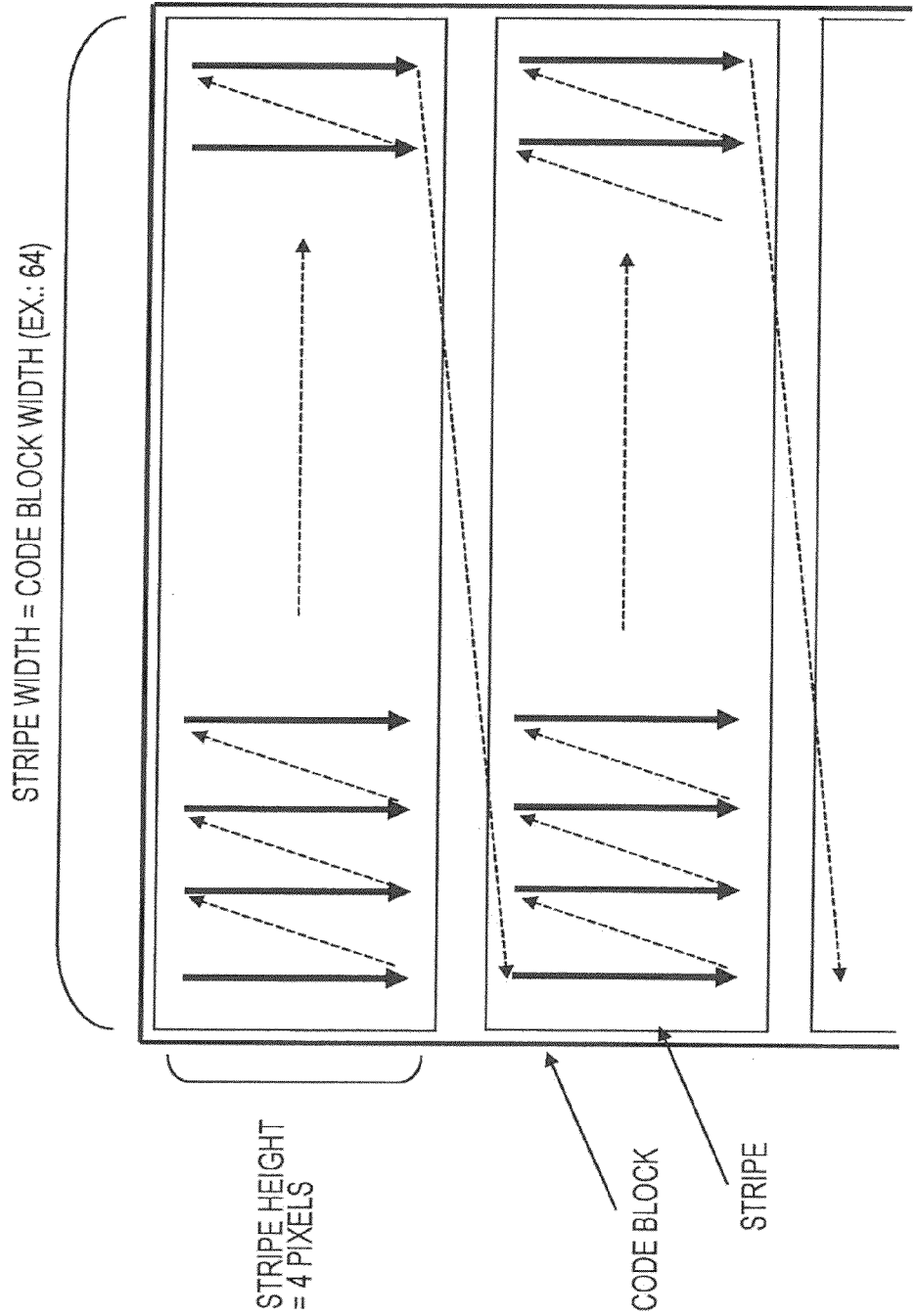
FIG. 8 is a diagram explaining exemplary coefficient scans.

Next, coefficient scanning will be described using FIG. 8. Code-blocks are divided into stripes with a height of four coefficients each. The width of the stripes is equal to the width of the code-blocks. The scan order is the order in which a scan traverses all coefficients in a single code-block, and is a sequence that proceeds from the top stripe to the bottom stripe in each code-block, from the left column to the right column in each stripe, and from top to bottom in each column. In each encoding pass, all coefficients in a code-block are processed in this scan order.

Hereinafter, the three encoding passes will be discussed. The following are all content stated in the JPEG 2000 written standard (ref.: ISO/IEC 15444-1, Information technology—JPEG 2000, Part 1: Core coding system).

(1) Significance Propagation Pass (SP Pass):

A significance propagation pass encoding a bit-plane arithmetically codes the bit-plane values of non-significant coefficients having at least one significant coefficient among their eight immediate neighbors. In the case where an encoded bit-plane value is 1, its sign is subsequently MQ encoded as plus or minus.

The term "significance" as it specifically pertains to JPEG 2000 will now be described. Significance is a state maintained by an encoder for respective coefficients. The default significance value is 0, which indicates a non-significant coefficient, but when 1 is encoded for that coefficient the value changes to 1, which indicates a significant coefficient, and the value continues to be 1 thereafter. Consequently, significance can also be said to be a flag indicating whether or not a significant digit has been already encoded. If a coefficient becomes significant in a given bit-plane, it stays significant in subsequent bit-planes.

(2) Magnitude Refinement Pass (MR Pass):

A magnitude refinement pass encoding the bit-plane MQ encodes the bit-plane values of significant coefficients which were not encoded in the significance propagation pass encoding the bit-plane.

(3) Cleanup Pass (CU Pass):

A cleanup pass encoding the bit-plane MP encodes the bit-plane values of non-significant coefficients which were not encoded in the significance pass encoding the bit-plane. In the case where an encoded bit-plane value is 1, its sign is subsequently MQ encoded as plus or minus (sign information).

Meanwhile, in the MQ encoding of the above three encoding passes, ZC (Zero Coding), RLC (Run-Length Coding), SC (Sign Coding), and MR (Magnitude Refinement) are separately used depending on the case. Herein, arithmetic coding called MQ coding is used. MQ coding is an adaptive binary arithmetic code defined in JBIG2 (ref.: ISO/IEC FDIS 14492, "Lossy/Lossless Coding of Bi-level Images", March 2000).

Returning to FIG. 2, the arithmetic encoder 137 supplies a generated codestream to the bit rate adder 138, as indicated by the arrow 169. The bit rate adder 138 counts and keeps a running total of the bit rate in the codestream.

Then, the bit rate adder 138 supplies the codestream to the header generator 140 and the packet generator 141, as indicated by the arrow 172 and the arrow 173, and additionally supplies the running total of the bit rate to the rate controller 139, as indicated by the arrow 170. The rate controller 139 controls the EBCOT unit 151 on the basis of the supplied running total of the bit rate, as indicated by the arrow 171, and terminates encoding once the running total has reached a target bit rate. In other words, the rate controller 139 conducts control of the output bit rate (rate control of the codestream).

The packet generator 141 packetizes the supplied codestream. The header generator 140 generates header information for the packets and supplies the header information to the packet generator 141, as indicated by the arrow 174. The packet generator 141 conducts packetization using the header information.

Figure 9:
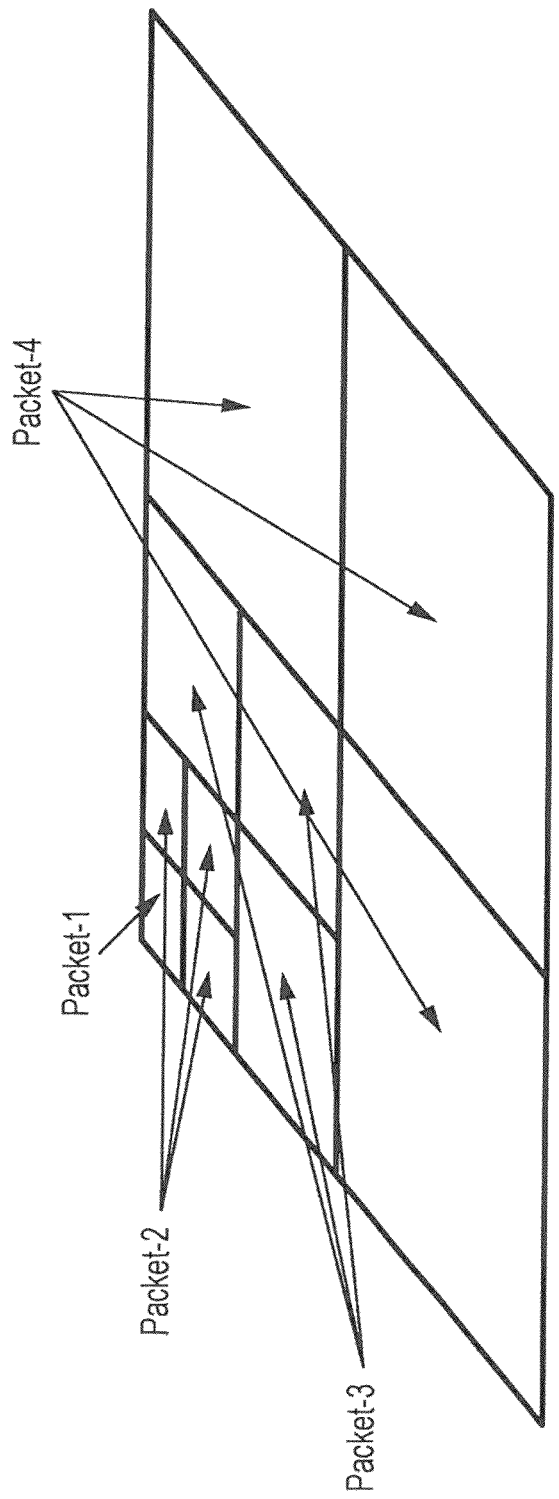
FIG. 9 is a diagram explaining layers.

The packets are conceptually illustrated in FIG. 9. In the example illustrated in FIG. 9, a wavelet transform has been performed three times, and as a result, the example illustrates that four packets from the lowest Packet-1 to the highest Packet-4 have been generated. Consequently, encoded codestreams for all code-blocks existing in the subbands in these individual packets are packed in the individual packets.

Figure 10:
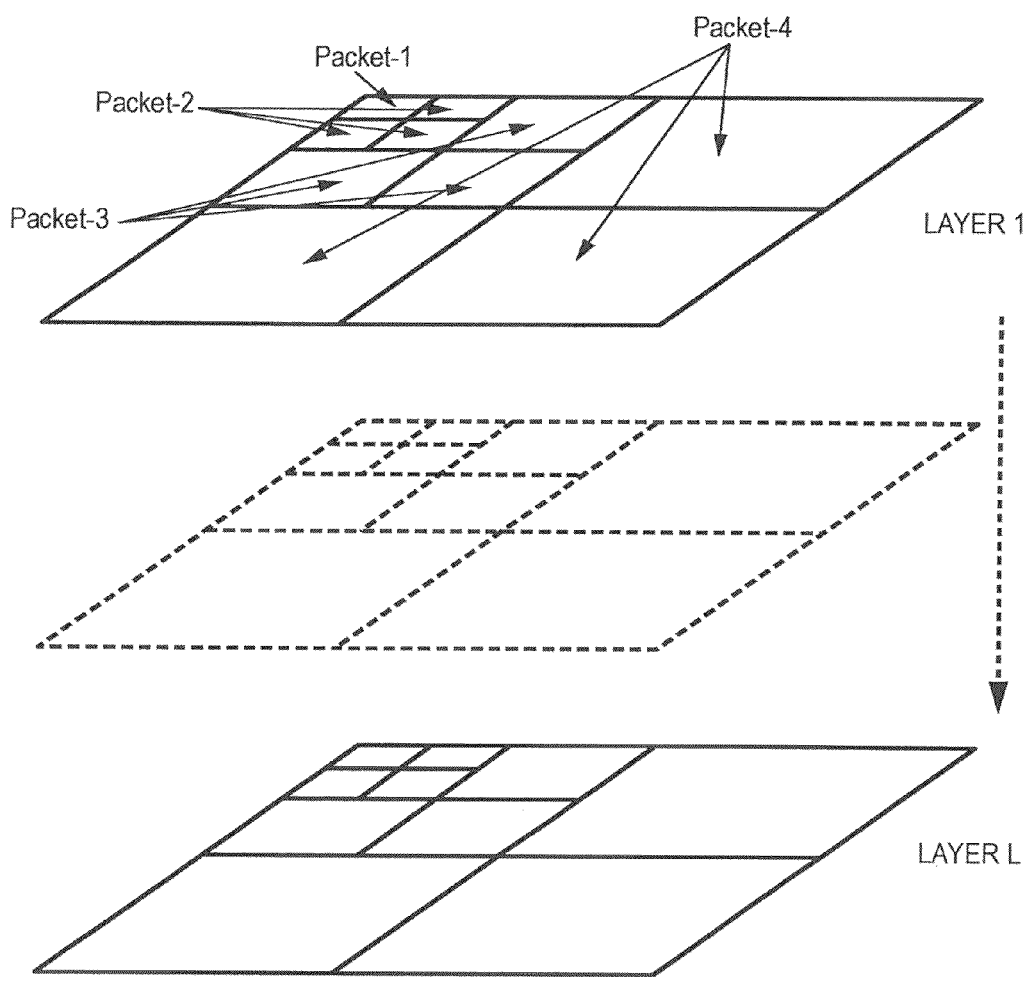
FIG. 10 is a diagram explaining an exemplary layer configuration.

Also, FIG. 10 is an illustration of a case in which encoding passes have been separated into L layers from layer 1 to layer L. In a given code-block, the first encoding pass for a layer n is positioned immediately after the last encoding pass for layer (n−1). Consequently, the bit rate of the codestream increases as the number of layers increases. In other words, the image quality of the decoded image increases (resolution is unchanged).

Consequently, when decoding, the image quality of the decoded image can be controlled by controlling how many layers to decode from layer 1 to layer n. Hereinafter, unless specifically noted, "image quality" will be taken to refer to the perceptual quality of a decoded image which depends on these layers (or in other words, the amount of information for each pixel).

Herein, the particular encoding pass of the particular code-block at which to draw the layer boundary can be set by the encoder (the image encoding apparatus 100). Codestreams for all code-blocks existing in the subbands in these individual packets are packed in the individual packets.

The generated packets are externally output from the encoder 101 and supplied to the codestream generator 102, as indicated by the arrow 175.

Each encoder 101 encodes image data in JPEG 2000 format as discussed above and generates a codestream having JPEG 2000's progressive functions with respect to resolution and layers, etc.

[Codestream Generator]

Figure 11:
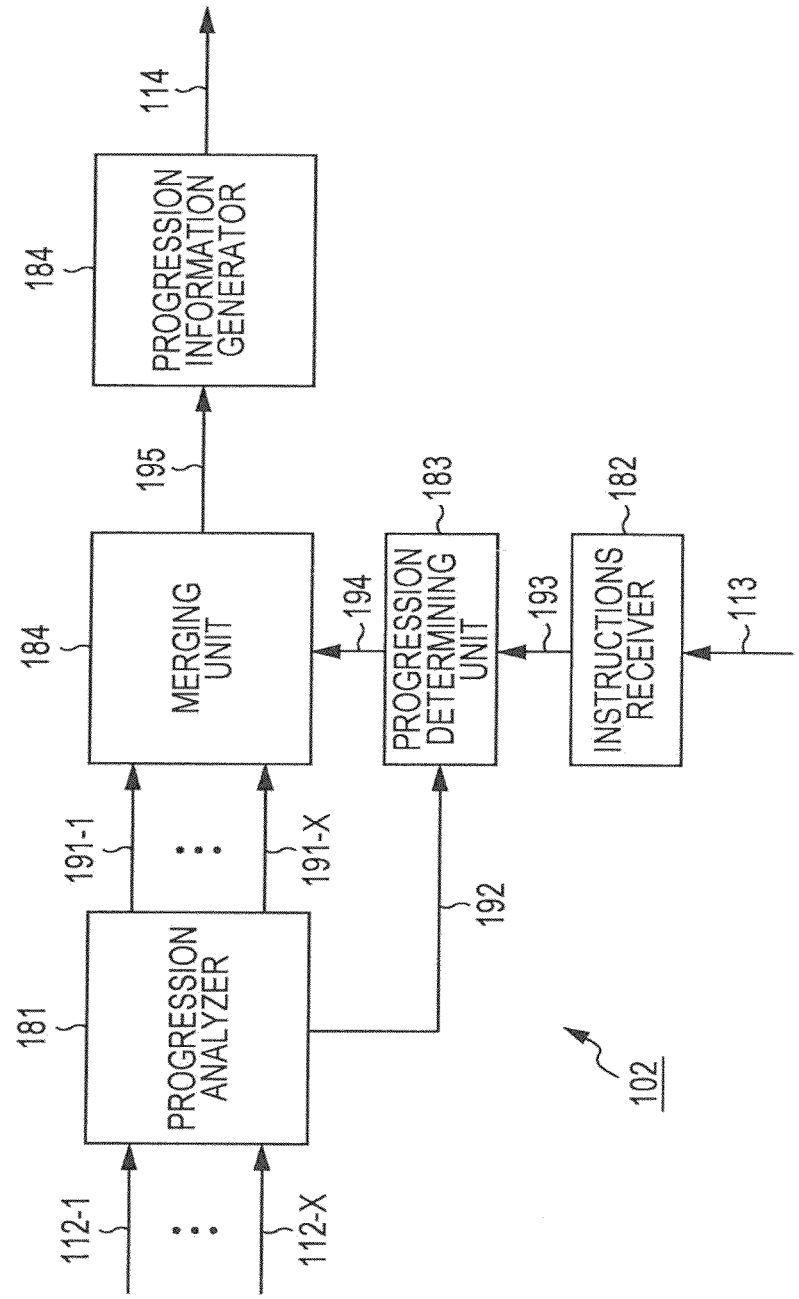
FIG. 11 is a block diagram illustrating an exemplary primary configuration of a codestream generator.

FIG. 11 is a block diagram illustrating an exemplary primary configuration of the codestream generator 102 in FIG. 1. As illustrated in FIG. 11, the codestream generator 102 includes a progression analyzer 181, an instructions receiver 182, a progression determining unit 183, a merging unit 184, and a progression information generator 185.

The progression analyzer 181 analyzes the progressive structure for respective input codestreams 112-1 to 112-X, and identifies the kind of structure of which each codestream is composed. The progression analyzer 181 supplies analyzed codestreams 191-1 to 191-X to the merging unit 184. Also, the progression analyzer 181 supplies analysis results for the respective codestreams to the progression determining unit 183 (arrow 192).

However, hereinafter the codestreams 191-1 to 191-X will be simply designated the codestreams 191 in cases where it is not necessary to individually distinguish them.

The instructions receiver 182 receives instructions 113 on a progressive structure for the merged codestream, which are externally supplied by the user or another apparatus, for example, and supplies them to the progression determining unit 183 (arrow 192). On the basis of the analysis results supplied from the progression analyzer 181 and the external instructions supplied by the instructions receiver 182, the progression determining unit 183 determines a progressive structure for the merged codestream and supplies its information to the merging unit 184 (arrow 194). However, the progression determining unit 183 may also be configured to determine a progressive structure not only analysis results and external instructions, but also other information as appropriate.

The merging unit 184 merges the respective codestreams supplied from the progression analyzer 181 on the basis of information regarding a progressive structure supplied by the progression determining unit 193, such that the merged codestream has a progressive structure with respect to resolution and image quality, and additionally with respect to respective views. The merging unit 184 supplies the single, merged codestream 195 to the progression information generator 185.

The progression information generator 185 generates progression information, which is information regarding the progressive structure of the codestream 194, and embeds the progression information at a given position in the merged codestream 194, such as in the header information, for example. The progression information generator 185 outputs a codestream 114 with attached progression information.

[JPEG 2000 Progression]

Some of the characteristics of JPEG 2000 encoding are bit-planes and subbands generated by wavelet transforms. With these, a definition of a progression becomes possible.

A progression is a sequence of code words belonging to the same category. For example, if the code words from different layers belonging to the same resolution level were collected, images having the same image size but different image quality could be generated. Likewise, if the code words from different resolution levels belonging to the same layer were collected, images having the same image quality but different image sizes could be generated. In other words, a progression is a data structure for realizing decoded image scalability.

In JPEG 2000, just a portion of the data from a codestream can be decoded for a given element in this way. Thus, a variety of decoded images can be easily obtained from a single codestream. In other words, by endowing a codestream with such a progressive structure, it becomes possible to use it in more varied applications, and the convenience of the codestream is improved.

For example, from a single codestream, a high-resolution decoded image with a high bit rate can be provided to a large and expressive, high-performance liquid crystal display, whereas a low-resolution decoded image with a low bit rate can be provided to a mobile phone, etc. having a small screen and low image processing performance. The above can be easily realized by selecting the progressive elements to decode, such as layers and subbands.

Moreover, such a progressive structure can not only be utilized for decoding, but also for transcoding, which changes the image size and quality, etc. of a decoded image. In other words, by merely selecting progressive elements such as layers and subbands similarly to the case of decoding discussed above, a codestream in which the decoded image size and quality has been changed can be easily generated (or in other words, transcoded).

In the case of JPEG 2000, there exist four progressive elements: resolution levels, layers, positions, and components.

Resolution levels are levels generated as part of wavelet transforms, as illustrated in FIG. 3. In other words, resolution levels define the image size of a decoded image. Layers are elements which dictate the image quality at levels in the bit-plane direction. Also, components are defined in the case where an image consists of different components, such as YCbCr, for example (the number of components becomes 3 in the case of YCbCr or RGB). Lastly, positions are related to tiling, one of the characteristics of JPEG 2000. Positions define the number and positions of respective tiles in the case of splitting a picture into a plurality of rectangular blocks for encoding/decoding.

In the case where plurality of progressive elements like the above exist, a tiered structure is created for each element. In the case of JPEG 2000 Part 1, five tiered structures using the elements discussed above are available: LRCP (Layer Resolution-level Component Position Progression), RLCP (Resolution-level Layer Component Position Progression), RPCL (Resolution-level Position Component Layer), PCRL (Position Component Resolution-level Layer), and CPRL (Component Position Resolution-level Layer).

Figure 12:
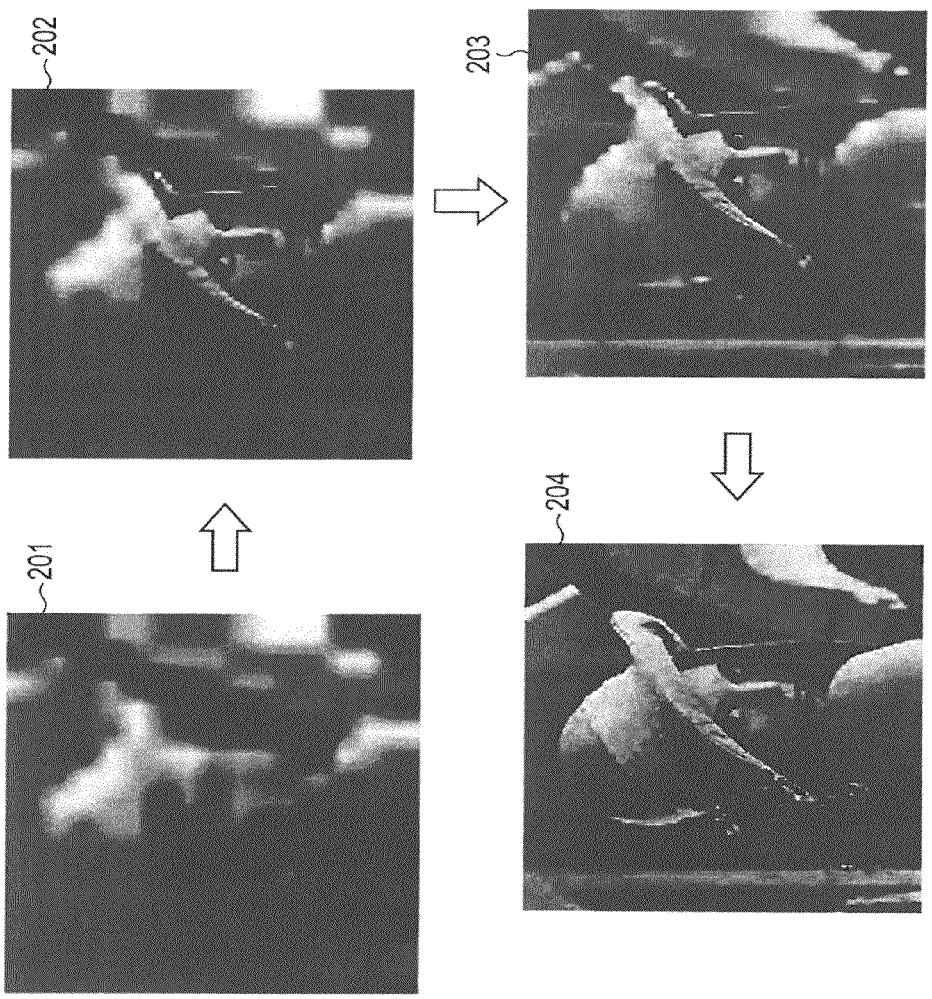
FIG. 12 is a diagram explaining an exemplary progressive function.

FIG. 12 is an illustration of decoded images which are generated by taking an encoded codestream in which JPEG 2000 code words are arranged in LRCP order, and decoding it in that order. In the case of this progressive structure, packets are arranged in the following order. Namely, code words are arranged such that layers are at the highest tier (total number of layers=L), resolution levels are at the next lower tier (N(max) is the maximum resolution level), components are at the next lower tier (Csiz is the total number of components), and positions are at the lowest tier. However, in the following, a description of positions (P) is omitted.

--- for each l = 0, ..., L−1
    for each r = 0, ..., N(max)
        for each i = 0, ..., Csiz−1
            { packet for component(i), resolution-level(r), layer(l) }

---

In this case, since the highest tier is a layer, decoded images are displayed with the image quality gradually improving, as with the sequence of the image 201, the image 202, the image 203, and the image 204 illustrated in FIG. 12.

Figure 13:
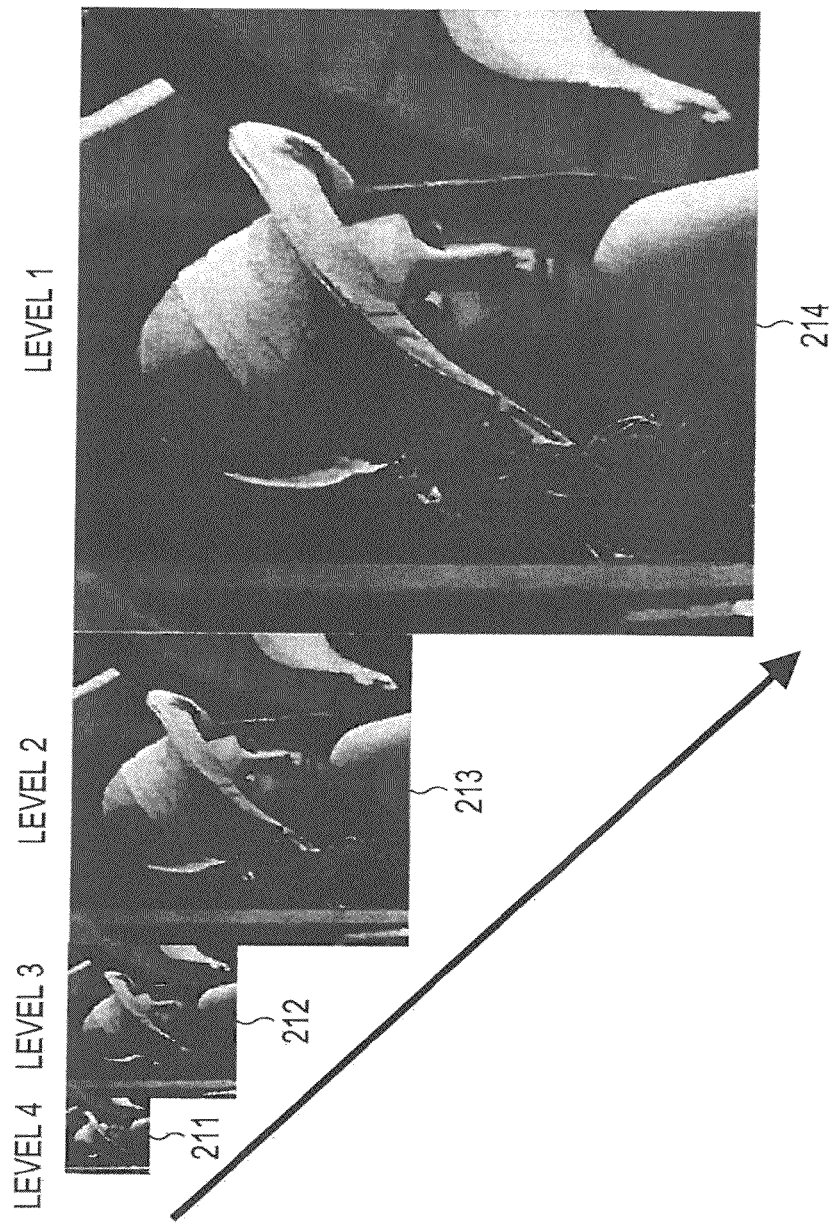
FIG. 13 is a diagram explaining another exemplary progressive function.

FIG. 13 is an illustration of decoded images which are generated by taking an encoded codestream in which JPEG 2000 code words are arranged in RLCP order, and decoding it in that order. In the case of this progression, packets are arranged in the following order. Namely, code words are arranged such that resolution levels are at the highest tier, layers are at next lower tier, components are at the next lower tier, and positions are at the lowest tier. However, in the following, a description of positions (P) is omitted.

--- for each r = 0, ..., N(max)
    for each l = 0, ..., L−1
        for each i = 0, ..., Csiz−1
            { packet for component(i), resolution-level(r), layer(l) }

---

In this case, since the highest tier is a resolution level, decoded images are displayed with gradually increasing image size (resolution), as with the sequence of the image 211, the image 212, the image 213, and the image 214 illustrated in FIG. 13.

In this way, the codestream decoding sequence differs according the tiered structure of respective progressive elements, and the way in which decoded images are display also changes. Decoding similarly proceeds in a sequence depending on the respective tiered structure for the other progressions RPCL, PCRL, and CPRL.

[Progression Definitions in JPEG 2000]

FIG. 14 is a diagram illustrating exemplary SGcod parameters. SGcod parameters are coding style parameters defined in Table A-14 of the JPEG 2000 Part 1 draft. It is possible to define the above progression orders with "Progression order" (8 bits) in SGcod.

In Table A-16, the five progressions LRCP, RLCP, RPCL, PCRL, and CPRL discussed earlier are defined, as illustrated in FIG. 15.

[Progression Extension]

The codestreams 112 which are supplied to the codestream generator 102 in FIG. 1 (the progression analyzer 181 in FIG. 11) have a JPEG 2000 progressive structure like that discussed above.

The codestream generator 102 (the merging unit 184 in FIG. 11) extends the progressive structure, merges the respective codestreams such that a progressive structure for multiview (a progressive structure that realizes scalability with respect to views) can be additionally added thereto, and generates a single codestream. An exemplary tiered structure of the merged progression will be described hereinafter.

[XLRCP]

Figure 16:
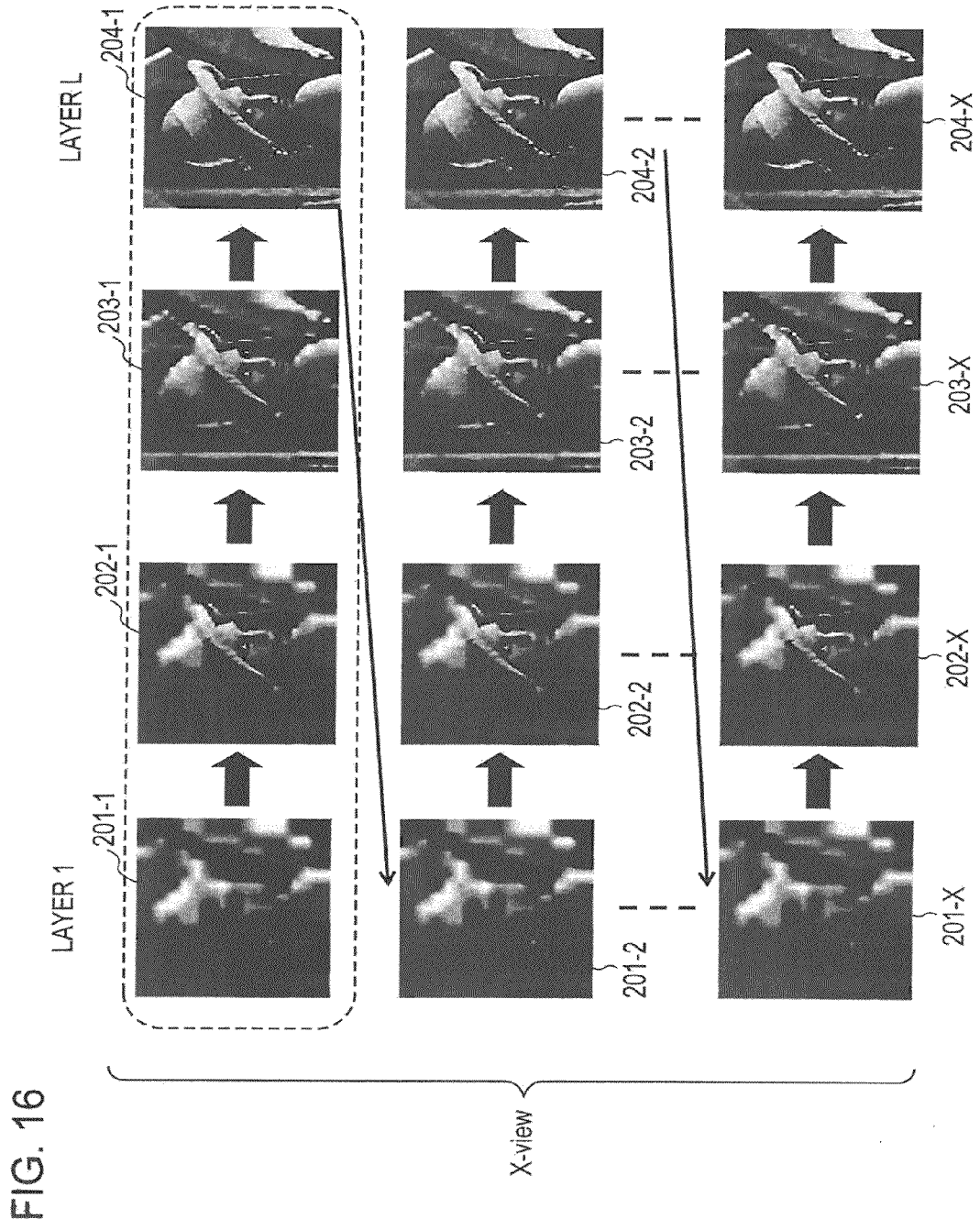
FIG. 16 is a diagram explaining an exemplary codestream decoding order to which the present invention has been applied.

A first exemplary tiered structure is XLRCP, which takes the highest tier to be views and the lower tiers to be LRCP. In this case, decoded images are decoded and displayed one view at a time, as illustrated in FIG. 16. In other words, an XLRCP codestream is first decoded from layer 1 to layer N for the 1st view, as with the image 201-1, the image 202-1, the image 203-1, and the image 204-1 (the image quality gradually improves).

Once decoded images for the 1st view are obtained, the codestream is next decoded from layer 1 to layer N for the 2nd view, as with the image 201-2, the image 202-2, the image 203-2, and the image 204-2 (the image quality gradually improves).

In this way, the codestream is decoded one view at a time, and lastly, the codestream is decoded from layer 1 to layer N for the Xth view, as with the image 201-X, the image 202-X, the image 203-X, and the image 204-X (the image quality gradually improves).

For example, in the case where the input image data 111 is multiview data with V views (or in other words, the case where the number of input views X=V), the codestream generator 102 (the merging unit 184) generates a codestream having such an XLRCP structure as follows. Note that in the following, the variable v expresses the number of views (the number of input views X) (VLRCP). One characteristic of multiview is that by increasing the number of cameras, a 3D image with a wide angle of view can be generated, and furthermore, extraction of the depth direction of an image can be realized much more easily compared to stereo. As a result, technology that interpolates/synthesizes images at arbitrary view points between cameras is also being investigated at many research institutions. Additionally, generating a panorama image by disposing cameras in a horizontal line is also useful in other applications besides 3D. However, in the following, a description of positions (P) is omitted.

```
for each v = 0, ..., V-1
    for each l = 0, ..., L-1
        for each r = 0, ..., N(max)
            for each i = 0, ..., Csiz-1
                { packet for view(v), component(i),
                  resolution-level(r), layer(l) }
```

Also, in the case where the input image data 111 is 3D image data (or in other words, the case where the number of input views X=2), for example, the codestream generator 102 (the merging unit 184) generates a codestream having such an XLRCP structure as follows. Note that in the following, the variable s expresses the view (left or right) (SLRCP). However, in the following, a description of positions (P) is omitted.

```
for each s = left, right
    for each l = 0, ..., L-1
        for each r = 0, ... N(max)
            for each i = 0, ..., Csiz-1
                { packet for stereo(s), component(i),
                  resolution-level(r), layer(l) }
```

[LXRCP]

Figure 17:
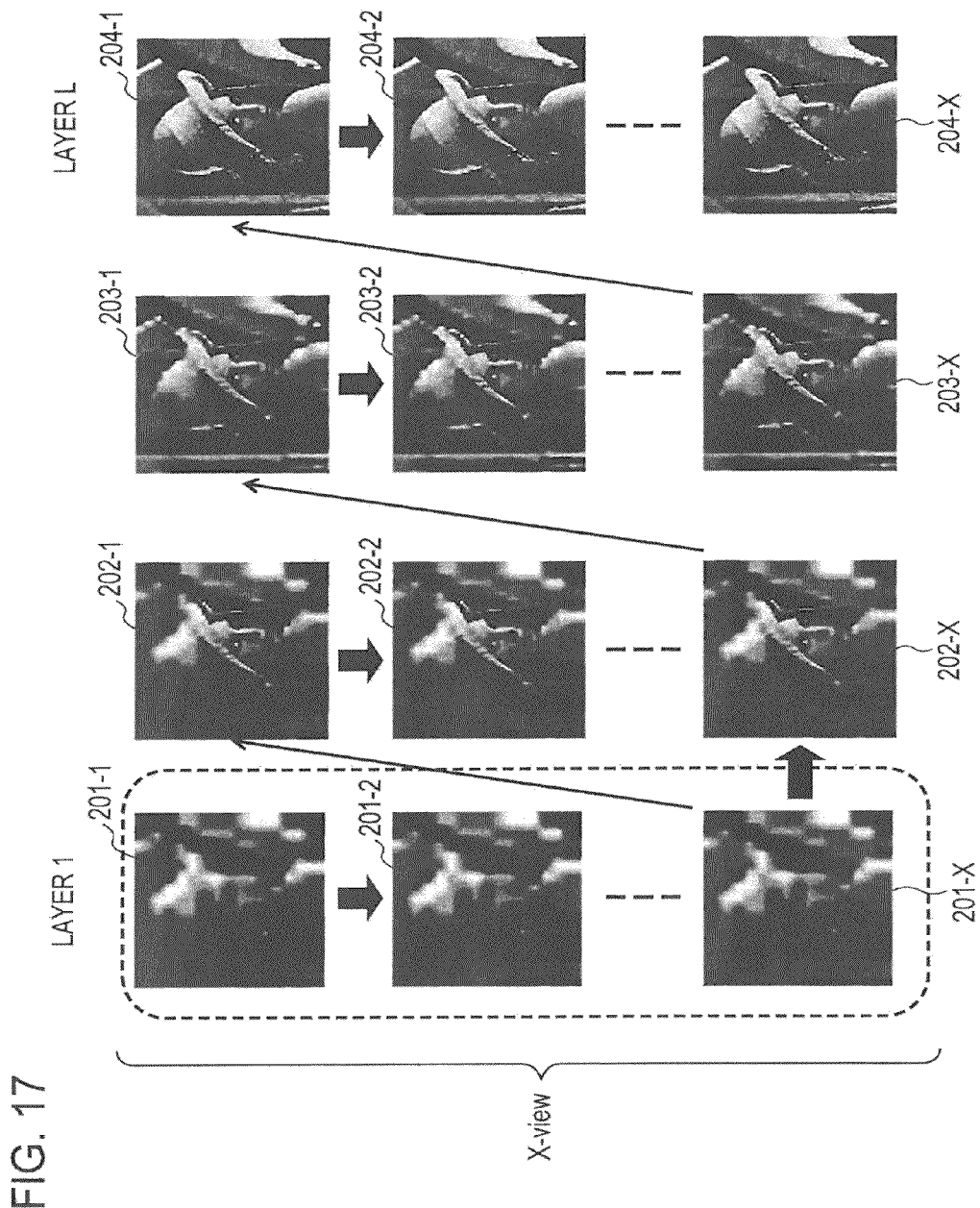
FIG. 17 is a diagram explaining another exemplary codestream decoding order to which the present invention has been applied.

A second exemplary tiered structure is LXRCP, which takes the second tier of LRCP to be views. In this case, decoded images are decoded and displayed one layer at a time, as illustrated in FIG. 17. In other words, an LXRCP codestream is first decoded in order from the 1st view to the Xth view for the 1st view, as with the image 201-1, the image 201-2, and so on to the image 201-X (X layer 1 images are generated).

Once X layer 1 decoded images are obtained, the codestream is next decoded in order from the 1st view to the Xth view for layer 2, as with the image 202-1, the image 202-2, and so on to the image 202-X (X layer 2 images are generated).

Subsequently, the codestream is similarly decoded in order from the 1st view to the Xth view for layer 3, as with the image 203-1, the image 203-2, and so on to the image 203-X (X layer 3 images are generated).

In this way, the codestream is decoded one layer at a time, and lastly, the codestream is decoded in order from the 1st view to the Xth view for layer L, as with the image 204-1, the image 204-2, and so on to the image 204-X (X layer L images are generated).

This exemplary structure is ideal for applications with small network bandwidth over which to transmit, for example, since by transmitting an encoded codestream in order from the lower layers to the upper layers, the image quality of stereo images gradually improves at the receiving side (decoding side).

For example, in the case where the input image data 111 is multiview data with V views (or in other words, the case where the number of input views X=V), the codestream generator 102 (the merging unit 184) generates a codestream having such an LXRCP structure as follows. Note that in the following, the variable v expresses the number of views (the number of input views X) (LVRCP). However, in the following, a description of positions (P) is omitted.

```
for each l = 0, ..., L-1
    for each v = 0, ..., V-1
        for each r = 0, ..., N(max)
            for each i = 0, ..., Csiz-1
                { packet for view(v), component(i),
                  resolution-level(r), layer(l) }
```

Also, in the case where the input image data 111 is 3D image data (or in other words, the case where the number of input views X=2), for example, the codestream generator 102 (the merging unit 184) generates a codestream having such an LXRCP structure as follows. Note that in the following, the variable s expresses the view (left or right) (LSRCP). However, in the following, a description of positions (P) is omitted.

```
for each l = 0, ..., L-1
    for each s = left, right
        for each r = 0, ..., N(max)
            for each i = 0, ..., Csiz-1
                { packet for stereo(s), component(i),
                  resolution-level(r), layer(l) }
```

Figure 18:
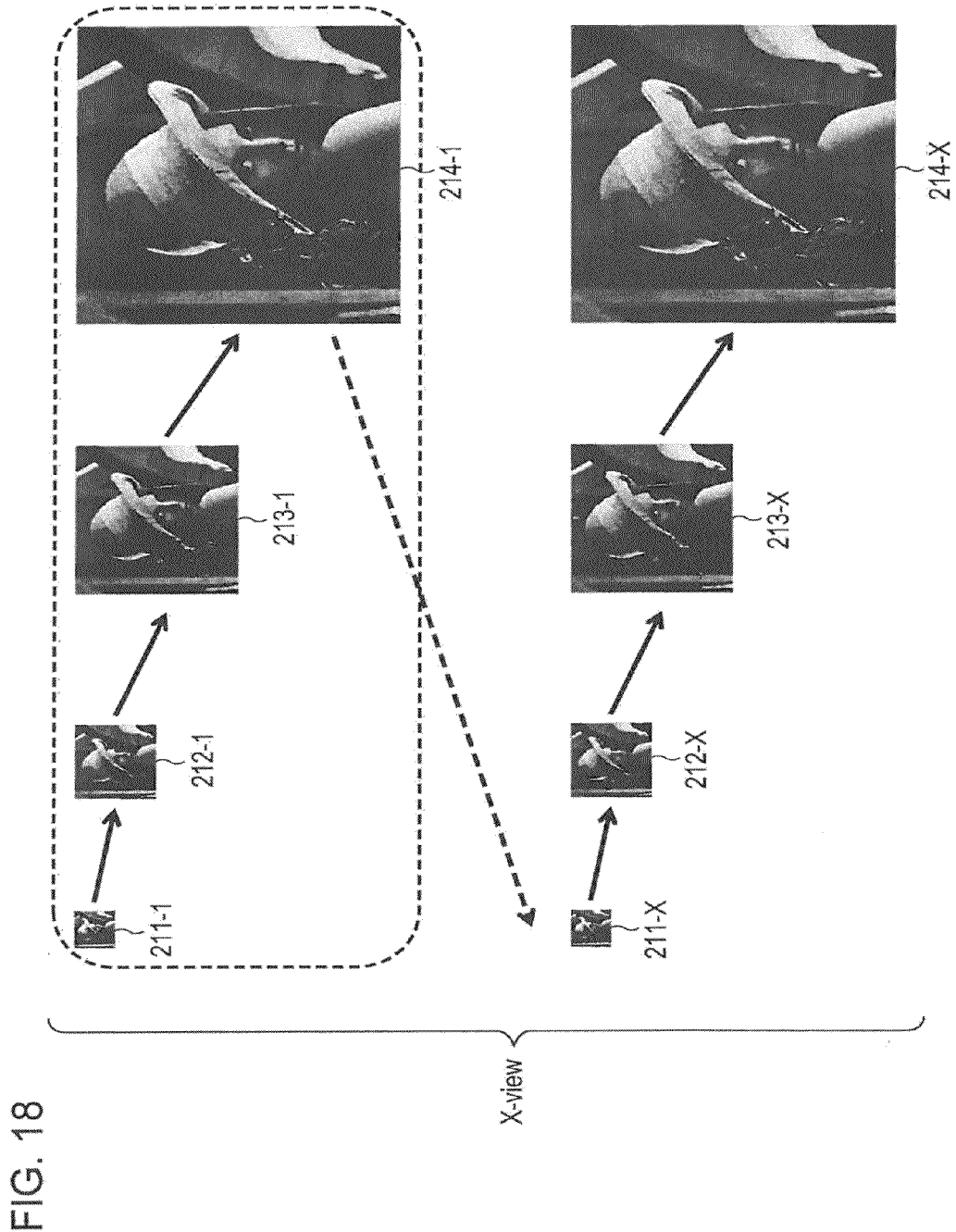
FIG. 18 is a diagram explaining yet another exemplary codestream decoding order to which the present invention has been applied.

A third exemplary tiered structure is XRLCP, which takes the highest tier to be views and takes the lower tiers to be RLCP. In this case, decoded images are decoded and displayed one view at a time, as illustrated in FIG. 18. In other words, an XRLCP codestream is first decoded from the lowest-tier resolution level to the highest-tier resolution level for the 1st view, as with the image 211-1, the image 212-1, the image 213-1, and the image 214-1 (the image size gradually increases).

Once decoded images for the 1st view are obtained, next the codestream is similarly decoded one view at a time for the second and subsequent views. Lastly, the codestream is decoded from the lowest-tier resolution level to the highest-tier resolution level for the Xth view, as with the image 211-X, the image 212-X, the image 213-X, and the image 214-X (the image size gradually increases).

For example, in the case where the input image data 111 is multiview data with V views (or in other words, the case where the number of input views X=V), the codestream generator 102 (the merging unit 184) generates a codestream having such an XRLCP structure as follows. Note that in the following, the variable v expresses the number of views (the number of input views X) (VRLCP). However, in the following, a description of positions (P) is omitted.

```
for each v = 0, ..., V-1
    for each r = 0, ..., N(max)
        for each l = 0, ..., L-1
            for each i = 0, ..., Csiz-1
                { packet for view(v), component(i),
                  resolution-level(r), layer(l) }
```

Also, in the case where the input image data 111 is 3D image data (or in other words, the case where the number of input views X=2), for example, the codestream generator 102 (the merging unit 184) generates a codestream having such an XLRCP structure as follows. Note that in the following, the variable s expresses the view (left or right) (SRLCP). However, in the following, a description of positions (P) is omitted.

```
        for each s = left, right
            for each r = 0, ... N(max)
                for each l = 0, ..., L–1
                    for each i = 0, ..., Csiz–1
                        { packet for stereo(s), component(i),
resolution-level(r), layer(l) }
```

Figure 19:
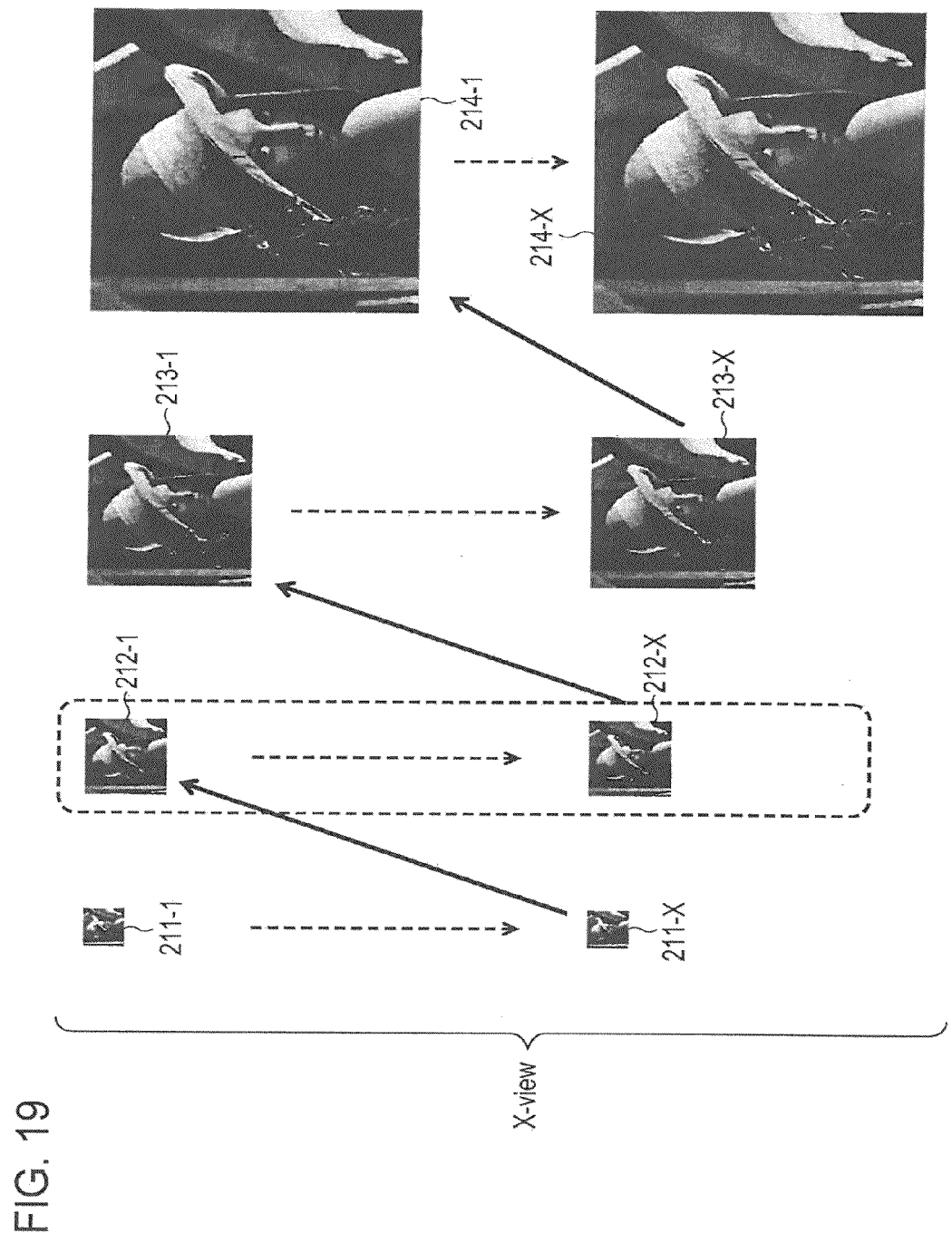
FIG. 19 is a diagram explaining yet another exemplary codestream decoding order to which the present invention has been applied.

A fourth exemplary tiered structure is RXLCP, which takes the second tier of RLCP to be views. In this case, decoded images are decoded and displayed one resolution level at a time, as illustrated in FIG. 19. In other words, an RXLCP codestream is first decoded in order from the 1st view to the Xth view for the lowest-tier resolution level, as with the images 211-1 to 211-X (X images at the lowest-tier resolution level are generated).

Once X decoded images at the lowest-tier resolution level are obtained, the codestream is next decoded in order from the 1st view to the Xth view for the next higher resolution level, as with the images 212-1 to 212-X (X images at the second resolution level from the bottom are generated).

Subsequently, the codestream is similarly decoded in order from the 1st view to the Xth view for the third resolution level from the bottom, as with the images 213-1 to 213-X (X images at the third resolution level from the bottom are generated).

In this way, the codestream is decoded one resolution level at a time, and lastly, the codestream is decoded in order from the 1st view to the Xth view for the highest-tier resolution level, as with the images 214-1 to 214-X (X images at the highest-tier resolution level are generated).

This exemplary structure is ideal for applications with small network bandwidth over which to transmit, for example, since by transmitting an encoded codestream in order from the lower layers to the upper layers, the resolution of stereo images gradually improves at the receiving side (decoding side). This exemplary structure is also ideal for applications that transmit and receive just the code words from the optimal tier depending on the displayable resolution of the receiving device (such as a television receiver (TV), portable display apparatus, or mobile terminal).

For example, in the case where the input image data 111 is multiview data with V views (or in other words, the case where the number of input views X=V), the codestream generator 102 (the merging unit 184) generates a codestream having such an RXLCP structure as follows. Note that in the following, the variable v expresses the number of views (the number of input views X) (RVLCP). However, in the following, a description of positions (P) is omitted.

```
        for each r = 0, ..., N(max)
            for each v = 0, ..., V–1
                for each l = 0, ..., L–1
                    for each i = 0, ..., Csiz–1
                        { packet for view(v), component(i),
resolution-level(r), layer(l) }
```

Also, in the case where the input image data 111 is 3D image data (or in other words, the case where the number of input views X=2), for example, the codestream generator 102 (the merging unit 184) generates a codestream having such an LXRCP structure as follows. Note that in the following, the variable s expresses the view (left or right) (RSLCP). However, in the following, a description of positions (P) is omitted.

```
        for each r = 0, ..., N(max)
            for each s = left, right
                for each l = 0, ..., L–1
                    for each i = 0, ..., Csiz–1
                        { packet for stereo(s), component(i),
resolution-level(r), layer(l) }
```

[Other Structures]

Extensions to RPCL, PCRL, and CPRL are basically conducted in a similar manner as the cases of LRCP and RLCP discussed above.

For example, a progressive structure for the case of RPCL is expressed below. In the following, (tx(0), tx(1)) expresses the left-edge X coordinate and the right-edge X coordinate of a given tile, while (ty(0), ty(1)) expresses the left-edge Y coordinate and the right-edge Y coordinate of a given tile.

```
        for each r = 0, ..., N(max)
            for each y= ty(0), ...., ty(1)–1
                for each x= tx(0), ...., tx(1)–1
                    for each i = 0, ..., Csiz–1
                        for each l = 0, ..., L–1
                            { packet for component(i),
resolution-level(r), layer(l) }
```

However, in the case of no tiling (only one tile exists in the picture), the second-tier and third-tier loops do not actually exist.

As above, the tiered structure differs for each progressive structure, but when merging codestreams, a progression for multiview (a data structure realizing view-related scalability) is inserted into a specified tier in all cases.

In so doing, 10 types of structures can be defined as merged progressive structures, such as XLRCP, LXRCP, XRLCP, RXLCP, XRPCL, RPXCL, VPCRL, PXCRL, XCPRL, and CXPRL, for example. Obviously, it may be configured such that structures other than the above are applied as merged progressive structures. For example, it may also be configured such that this progression for multiview is inserted into another tier. Also, some of the 10 types discussed above may also not be included. Also, any number of available progressive structures is acceptable, and there may be nine types or less, or 11 types or more.

[Extended Progression Definition]

In the case of JPEG 2000, the tiered structure of a progression is defined by the "Progression order" (8 bits) in SGcod, as explained with reference to FIG. 15. In the progression information generator 185, the upper 4 bits are also used to extend the "Progression order" and define the 10 tiered structures discussed earlier (XLRCP (0001 0000), LXRCP (0010 0000), XRLCP (0001 0001), RXLCP (0010 0001), XRPCL (0001 0010), RPXCL (0010 0010), XPCRL (0001 0011), PXCRL (0010 0011), XCPRL (0001 0100), and CXPRL (0010 0100)), as illustrated in FIG. 20.

The progression information generator 185 sets the "Progression order" of the SGcod parameters, which exists in the tile-part header or the main header of the single codestream 195 merged by the merging unit 184, to a value corresponding to the progressive structure of that codestream 195.

Obviously, the value assigned to each progressive structure is arbitrary, and it may be configured such that values other than those illustrated in FIG. 20 are assigned. The method of defining tiered structures is also arbitrary, and it may also be configured such that tiered structures are defined in other parameters. For example, it may also be configured such that tiered structures are defined in SPcoc and Ppoc in the same COD marker segment. For example, it may be configured such that tiered structures are defined in at least one from among SGcod, SPcoc, and Ppoc.

Obviously, tiered structures may also be defined in parameters other than the above. However, by using the upper 4 bits of the "Progression order" to extend the definition as illustrated in FIG. 20, the affinity with conventional JPEG 2000 can be increased, such as by maintaining compatibility with conventional JPEG 2000 in the lower 4 bits. Consequently, conventional JPEG 2000 data that does not support such an extension can be conventionally decoded as a four-element tiered structure with the lower 4 bits.

[Definition of Number of Views]

Next, a definition of the number of views (number of input views) will be explained. FIG. 21 is Table A-10 defining the Rsiz (16 bits) of the SIZ marker in the main header defined in JPEG 2000 Part 1. The main text of specification contains the following description.

Rsiz: Denotes capabilities that a decoder needs to properly decode the codestream.

In this way, according to Table A-10, although Rsiz is assigned 16 bits, at present it is only used to define Profile 0 and Profile 1 (with the partial exception of Rsiz=3 being used for 2K resolution and Rsiz=4 being used for 4K resolution in the Digital Cinema standard (DCI standard)).

The progression information generator 185 is configured to utilize this empty area to define a number of views by using the upper 12 bits of Rsiz, as illustrated in FIG. 22. By configuring in this way, a maximum of 4,096 is supportable. Note that the symbol "x" in FIG. 22 means "unavailable".

The progression information generator 185 sets the Rsiz value in the main header of the codestream 195 generated in the merging unit 184 to a value corresponding to the number of views X in the pre-merge codestreams, in accordance with the definition in FIG. 22.

Obviously, the method of defining the number of views is arbitrary, and it may be configured such that the number of views is defined elsewhere than Rsiz. However, by defining the number of views in Rsiz as discussed earlier, a high affinity with conventional JPEG 2000 is kept without unnecessarily increasing the data size, and a large number of input views (a maximum number of 4,096) can be easily supported.

[Multiview Input Encoding Process Flow]

Next, exemplary flows will be described for processes executed by an image encoding apparatus 100 like the above.

Figure 23:
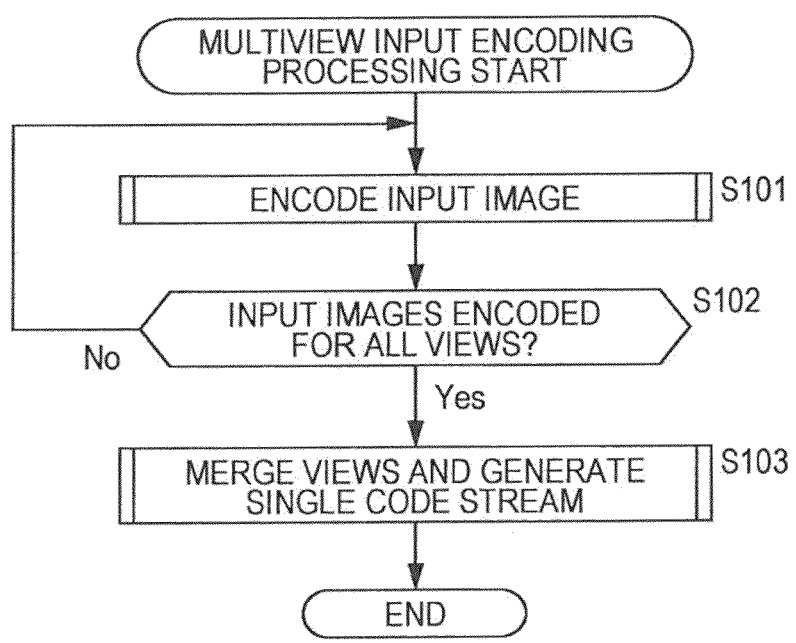
FIG. 23 is a flowchart explaining an exemplary flow of a multi-input encoding process.

First, the flowchart in FIG. 23 will be referenced to describe an exemplary flow of a multiview input encoding process, executed by the image encoding apparatus 100, which encodes multiview input image data, merges them so as to have progressive functions, and generates a single codestream.

When input image data 111 is input and the multiview input encoding process is initiated, in step S101 each encoder 101 encodes the input image data 111 input into its own corresponding input view. In step S102, the image encoding apparatus 100 determines whether or not input images have been encoded for all views, and in the case of determining that unprocessed views exist, returns the process to step S101 and stands by until determining that input images have been processed for all views.

The image encoding apparatus 100 advances the process to step S103 in the case of determining in step S102 that input images have been encoded for all views. In step S103, the codestream generator 102 merges the codestreams of the respective views and generates a single codestream having progressive functions. Once a codestream is generated, the image encoding apparatus 100 ends the multiview input encoding process.

[Encoding Process Flow]

Figure 24:
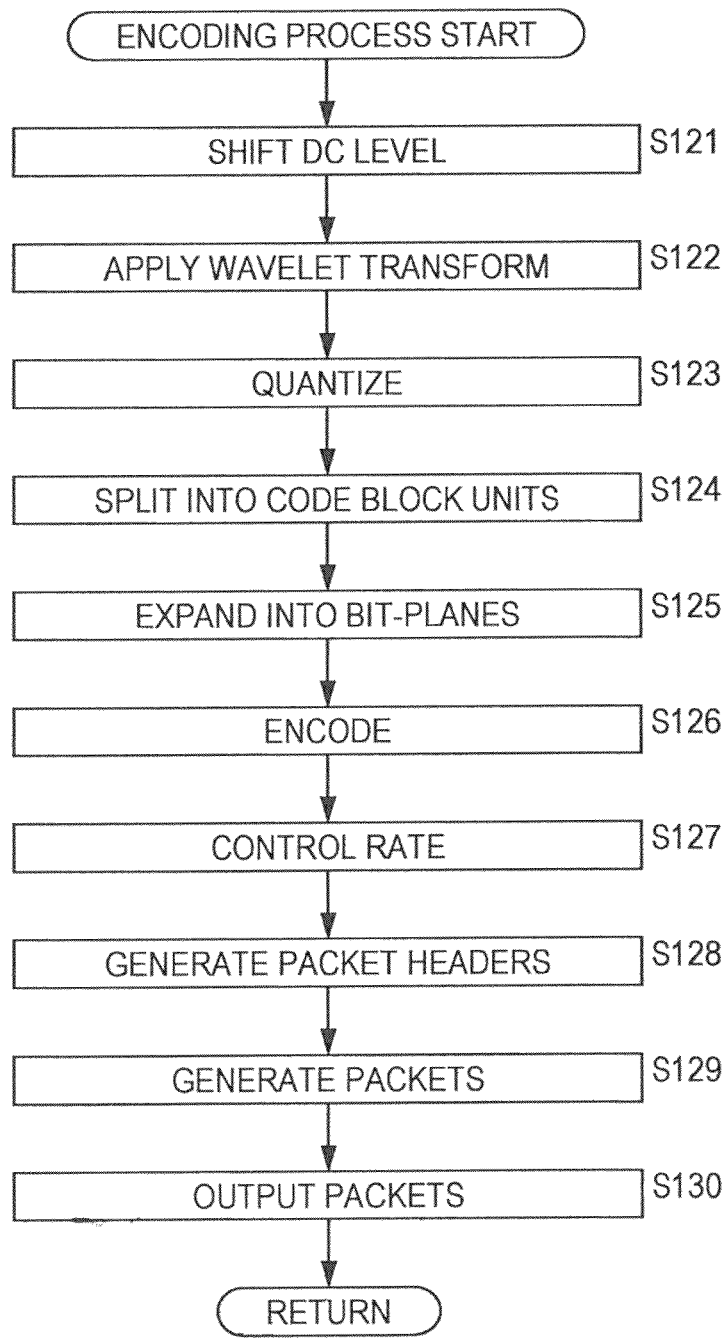
FIG. 24 is a flowchart explaining an exemplary flow of an encoding process.

Next, the flowchart in FIG. 24 will be referenced to describe an exemplary flow of a process for encoding respective views executed in step S101 of FIG. 23.

When the encoding process is initiated, in step S121 the DC level shifter 131 shifts the DC level of the image data input by its own corresponding input view. In step S122, the wavelet transform unit 132 applies a wavelet transform to the DC level-shifted image data.

In step S123, the quantizer 133 quantizes the wavelet coefficients generated in step S122 in the case of a lossy coding format. However, in the case of a lossless coding format, this processing is omitted.

In step S124, the code blocking unit 134 splits the quantized coefficients into code-block units. In step S125, the bitplane expander 135 expands the coefficients in each of those code-blocks into bitplanes.

In step S126, the EBCOT unit 151 encodes the bitplane-expanded coefficients. In step S127, the rate controller 139 controls the output bit rate by using the bit rate added up in the bit rate adder 138, etc.

In step S128, the header generator 140 generates packet headers. In step S129, the packet generator 141 generates packets. In step S130, the encoder 101 externally outputs the packets.

Once the processing in step S130 ends, the encoding process is terminated. However, this encoding process is repeatedly and individually executed on given data units until the supply of image data ends or until termination instructions are received. Also, this encoding process is executed in each encoder 101.

By conducting such an encoding process, the encoders 101 are able to encode input images for respective views so as to have a progressive structure, i.e. a data structure for realizing decoded image scalability.

[Codestream Generation Process Flow]

Figure 25:
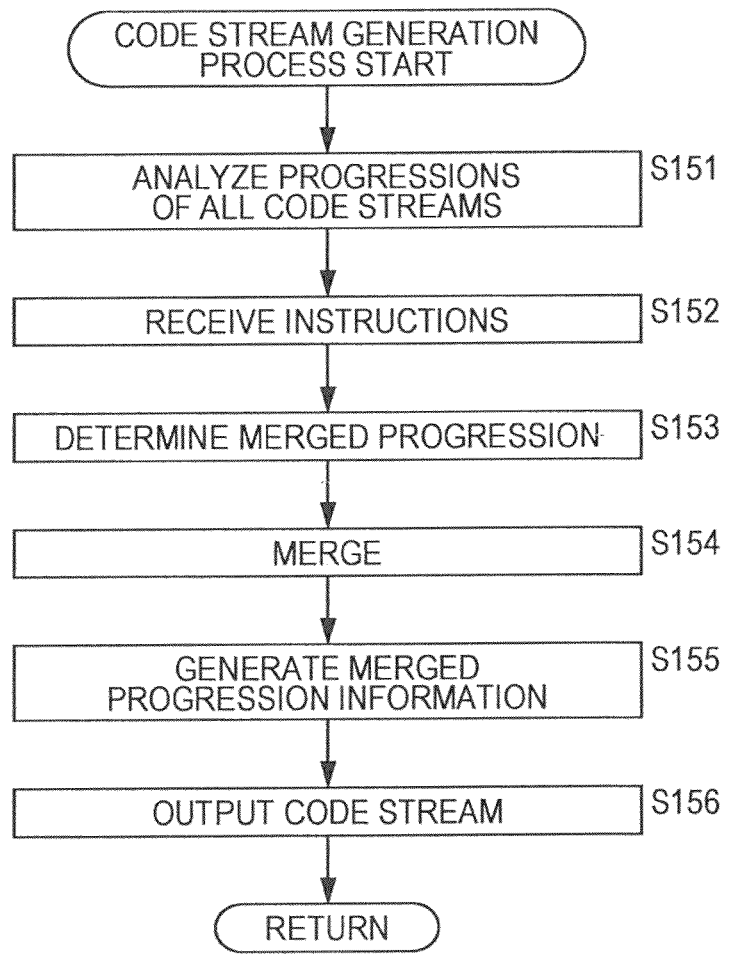
FIG. 25 is a flowchart explaining an exemplary flow of a codestream generation process.

Next, the flowchart in FIG. 25 will be referenced to describe an exemplary flow of the codestream generation process executed in step S103 of FIG. 23.

The codestream generator 102 initiates the codestream generation process upon being supplied with codestreams 112 from the encoders 101. Once the codestream generation process is initiated, in step S151 the progression analyzer 181 analyzes the progression for all codestreams supplied from the encoders 101.

In step S152, the instructions receiver 182 receives instructions regarding the progressive structure after merging the codestreams, the instructions being supplied from the user or an external apparatus, for example.

In step S153, the progression determining unit 183 determines a progressive structure for the merged codestream on the basis of analysis results obtained by the processing in step S151 and external instructions received by the processing in step S152.

In step S154, the merging unit 184 merges the codestreams of the respective views so as to have the progressive structure determined in step S153. In step S155, the progression information generator 185 generates progression information for the merged codestream, and adds the progression information to given positions in the merged codestream, such as in "Progression order" in SGcod or in Rsiz of the SIZ marker.

In step S156, the progression information generator 185 outputs the codestream.

In this way, the codestream generator 102 is able to merge the codestreams of respective views so as to have a structure in which a progressive structure with respect to views (a data structure realizing view-related scalability) has been added to the progressive structure of the codestreams. In so doing, the image encoding apparatus 100 is able to encode multiview input images, realize decoded image scalability, and generate a codestream that is usable in more varied applications.

Also, since progression information expressing the merged progressive structure (extended progressive structure) is added to a codestream, an image decoding apparatus decoding that codestream is able to easily decode the codestream on the basis of the progression information added to that codestream.

In other words, the image encoding apparatus 100 is able to improve the convenience of codestreams in which multiview images are encoded.

Meanwhile, it may also be configured such that progression information is provided to the decoding side as separate data from the codestream. However, in this case, it is necessary to clarify the associative relationship between a codestream and progression information (i.e., enable the decoding side to ascertain the associative relationship).

2. Second Embodiment

[Image Decoding Apparatus Configuration]

Figure 26:
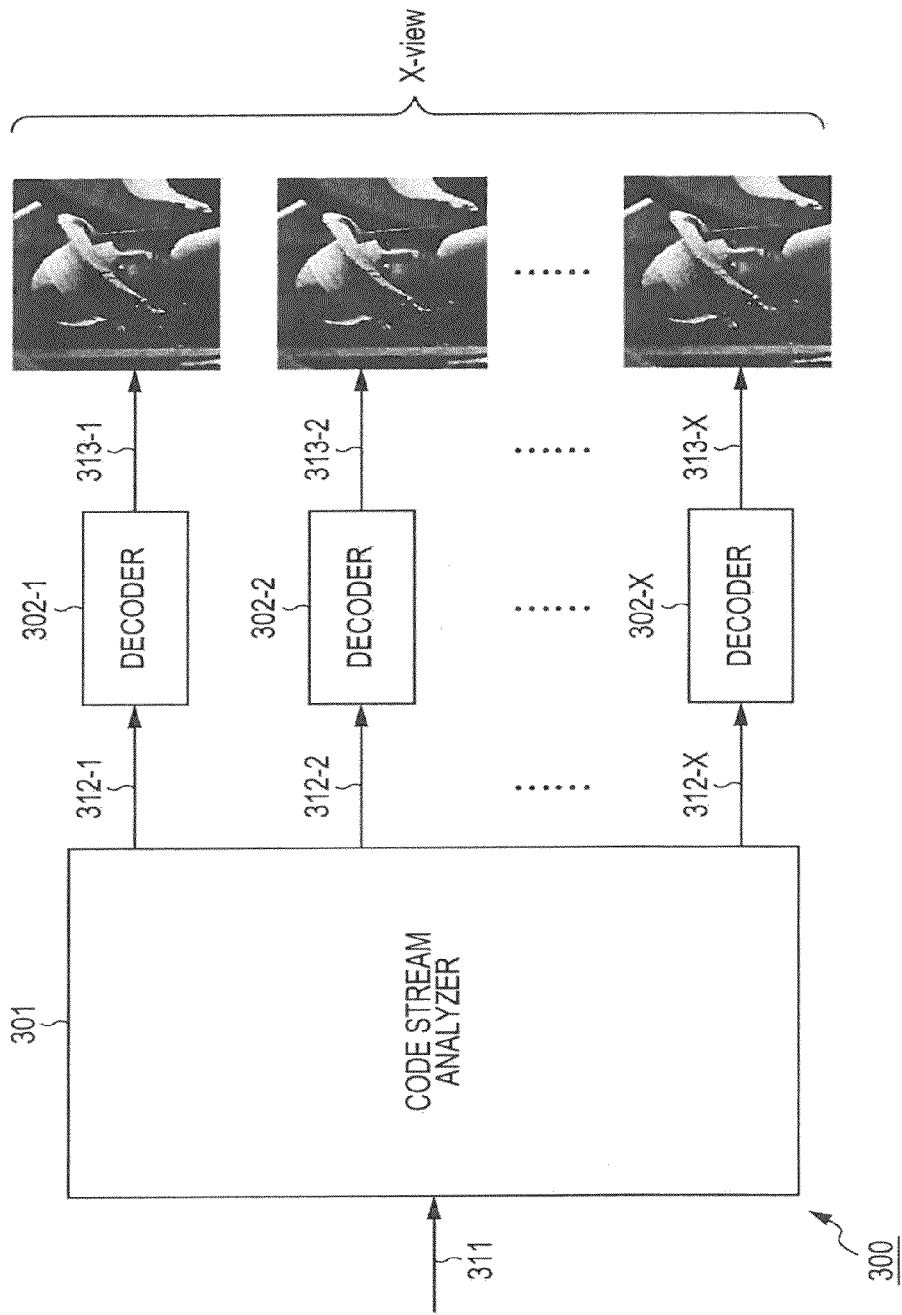
FIG. 26 is a block diagram illustrating an exemplary primary configuration of an image decoding apparatus to which the present invention has been applied.

FIG. 26 is a block diagram illustrating an exemplary primary configuration of an image decoding apparatus to which the present invention has been applied.

The image decoding apparatus 300 illustrated in FIG. 26 is a decoding apparatus corresponding to the image encoding apparatus 100 in FIG. 1. The image decoding apparatus 300 takes a single code stream which has been generated by the image encoding apparatus 100 encoding and merging multiview input images, decodes and splits it to generate multiview decoded images.

When so doing, the image decoding apparatus 300 is able to decode the codestream according to a progression structure, i.e. a data structure for realizing decoded image scalability, possessed by the input codestream, and obtain multiview decoded images. Obviously, the image decoding apparatus 300 may also be configured to be able to decode only necessary information according to the progressive structure possessed by the input codestream, and obtain decoded images whose image quality and image size, etc. are suitable to an application (application-dependent decoded images).

As illustrated in FIG. 26, the image decoding apparatus 300 includes a codestream analyzer 301, as well as decoders 302-1 to 302-X.

The codestream analyzer 301 analyzes the progressive structure of an input codestream 311 on the basis of progression information added to the codestream 311, and splits the codestream 311 into pre-merge codestreams for X views.

The codestream analyzer 301 supplies the split codestreams 312-1 to 312-X to the respectively corresponding decoders 302-1 to 302-X. The decoders 302-1 to 302-X respectively decode the input codestreams by a method corresponding to the encoders 101 in FIG. 1, and generate and output decoded image data 313-1 to 313-X.

In other words, the image decoding apparatus 300 accepts a codestream 311 as input, and outputs decoded images from X respective output views (in other words, decoded images for X views are output). At this point, the image decoding apparatus 300 is able to decode the codestream in an order following the progressive structure of the codestream 311, or decode only a portion of the data following the progressive structure of the codestream 311. In this way, the image decoding apparatus 300 is able to more easily obtain decoded images depending on various applications from the codestream 311 (realize decoded image scalability).

Note that hereinafter, the decoders 302-1 to 302-X will be simply designated the decoders 302 in cases where it is not necessary to individually distinguish them. Also, hereinafter, the codestreams 312-1 to 312-X will be simply designated the codestreams 312 in cases where it is not necessary to individually distinguish them. Furthermore, hereinafter, the decoded image data 313-1 to 313-X will be simply designated the decoded image data 313 in cases where it is not necessary to individually distinguish them.

Although the decoders 302 are described as being provided for individual views in the foregoing, it may also be configured such that a single decoder 302 is able to respectively decode codestreams 312 for a plurality of views. For example, the image decoding apparatus 300 may be configured to include one decoder 302, and that decoder 302 may be configured to respectively decode codestreams 312 for X views and generate decoded image data 313 for X views.

[Codestream Analyzer Configuration]

Figure 27:
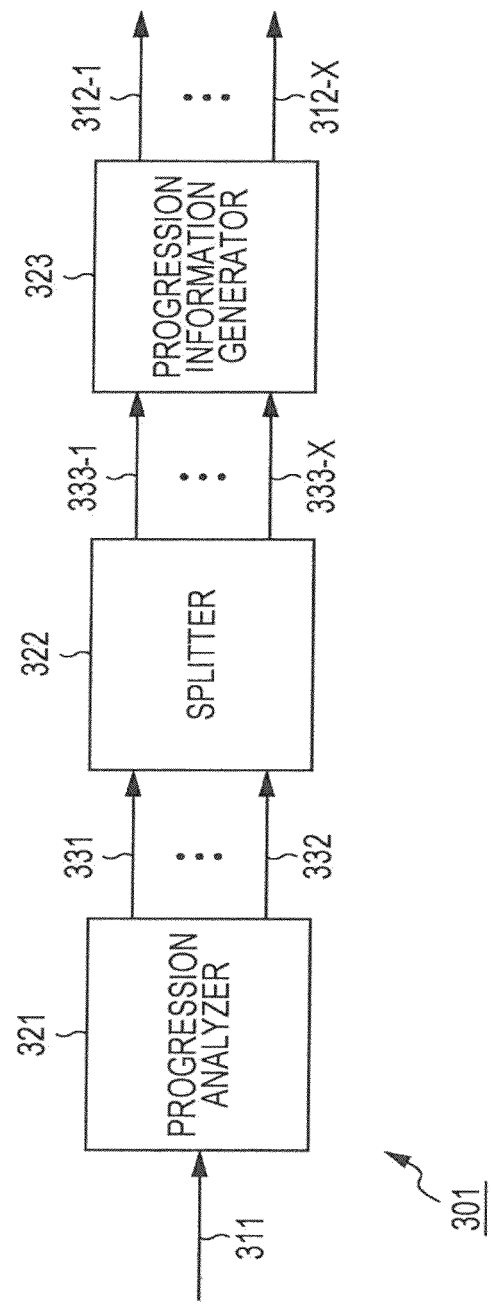
FIG. 27 is a block diagram illustrating an exemplary primary configuration of a codestream analyzer.

FIG. 27 is a block diagram illustrating an exemplary primary configuration of the codestream analyzer 301 in FIG. 26. As illustrated in FIG. 27, the codestream analyzer 301 includes a progression analyzer 321, a splitter 322, and a progression information generator 323.

The progression analyzer 321 analyzes progression information added to an input codestream 311, and analyzes the progressive structure of the codestream 311. For example, the progression analyzer 321 may reference the "Progression order" in SGcod or the Rsiz of the SIZ marker stated in the main header or tile-part header of the codestream 311, and ascertain the progressive structure of the codestream 311 and its number of views. The progression analyzer 321 supplies an analyzed codestream 331 and the analysis results 332 to the splitter 322.

The splitter 322 splits a single codestream 331 into pre-merge codestreams for X views on the basis of progression analysis results supplied from the progression analyzer 321, and on the basis of a progressive structure for multiview (a data structure realizing view-related scalability) possessed by a codestream 331 supplied from the progression analyzer 321.

In a codestream 331, encoded data in individual given units is arrayed according to the order of the progressive structure. The splitter 322 switches the decoder 302 acting as the supply source of the codestream 331 according to the part of the progressive structure with respect to views in the progressive structure possessed by that codestream 331.

In other words, in a codestream 331, partial data of pre-merge codestreams for respective views is arranged according to a progressive structure for multiview. The splitter 322 outputs the respective partial data to the views to which that partial data belongs, according to the progressive structure for multiview. By this process, a codestream 331 is split into X views.

The splitter 322 supplies split codestreams 333-1 to 333-X to the progression information generator 323. The progression information generator 323 generates progression information indicating a progressive structure for each of the codestreams 333-1 to 333-X, and adds it to given positions in the codestreams 333-1 to 333-X.

The progression information generator 323 supplies codestreams 312-1 to 312-X with added progression information to the decoders 302 for the respective views.

However, hereinafter the codestreams 333-1 to 333-X will be simply designated the codestreams 333 in cases where it is not necessary to individually distinguish them.

[Decoder Configuration]

Figure 28:
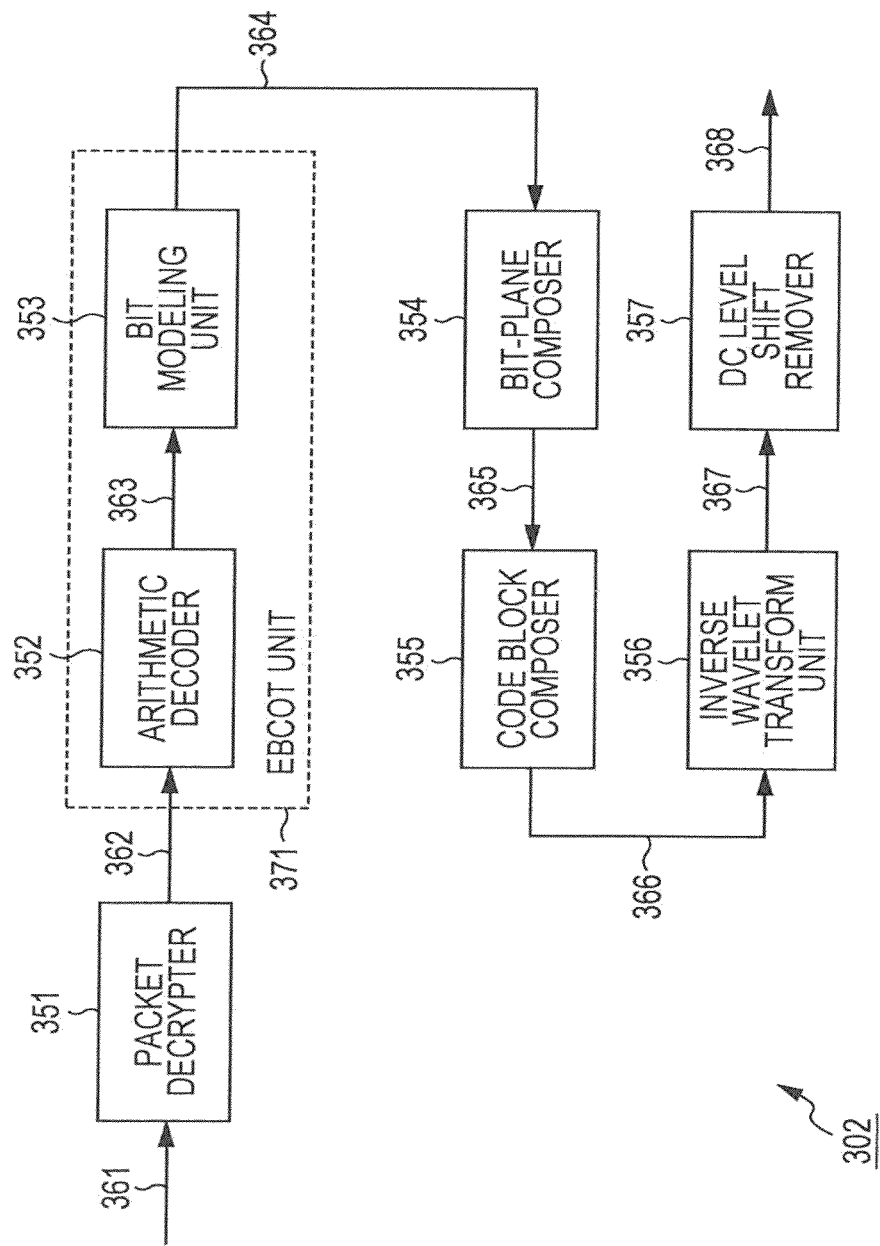
FIG. 28 is a block diagram illustrating an exemplary primary configuration of a decoder.

FIG. 28 is a block diagram illustrating an exemplary primary configuration of a decoder 302. This decoder 302 corresponds to the encoders 101 in FIG. 1, and decodes a codestream which has been encoded and generated by an encoder 101. As illustrated in FIG. 28, the decoder 302 includes a packet decrypter 351, an arithmetic decoder 352, a bit modeling unit 353, a bitplane composer 354, a code-block composer 355, an inverse wavelet transform unit 356, and a DC level shift remover 357.

The packet decrypter 351 decrypts packets supplied from an image encoding apparatus 100 as indicated by the arrow 361, and supplies a codestream to the arithmetic decoder 352 as indicated by the arrow 362.

The arithmetic decoder 352 and the bit modeling unit 353 act as an EBCOT unit 371 and conduct the entropy decoding called EBCOT which is defined in the JPEG 2000 standard, for example, on the input codestream.

The arithmetic decoder 352 decodes the codestream with a method corresponding to the arithmetic encoder 137, and supplies context to the bit modeling unit 353 as indicated by the arrow 363. The bit modeling unit 353 generates bitplane-expanded wavelet coefficients with a method corresponding to the bit modeling unit 136. The bit modeling unit 353 supplies the coefficient data for each generated bitplane to the bitplane composer 354 as indicated by the arrow 364.

The bitplane composer 354 composes the bitplane-expanded wavelet coefficients. The bitplane composer 354 supplies the bitplane-composed wavelet coefficients to the code-block composer 355 as indicated by the arrow 365.

The code-block composer 355 uses the supplied bitplanes to generate coefficient data in code-block units and additionally composes them to generate coefficient data for each subband. The code-block composer 355 supplies the result to the inverse wavelet transform unit 356 as indicated by the arrow 366.

The inverse wavelet transform unit 356 applies an inverse wavelet transform to the supplied wavelet coefficients and generates baseband image data. The inverse wavelet transform unit 356 supplies the generated baseband image data to the DC level shift remover 357 as indicated by the arrow 367.

The DC level shift remover 357 conducts a DC level shift removal process as necessary, which removes the shift that was applied to the DC component of the image data in the DC level shifter 131. The DC level shift remover 357 outputs image data which has been subjected to the DC level shift removal process (decoded image data) externally from the decoder 302 as indicated by the arrow 368.

In each codestream 312, encoded data in individual given units is arrayed in an order according to a progressive structure. Consequently, codestreams 312 can be decoded in an order according to the progressive structure included in the codestreams 312 as a result of the decoders 302 sequentially decoding input codestreams 312.

[Multiview Output Decoding Process Flow]

Next, exemplary flows will be described for various processes executed by an image decoding apparatus 300 like the above. The image decoding apparatus 300 conducts a multiview output decoding process in order to decode a codestream in which multiview images are merged. First, an exemplary flow of this multiview output decoding process will be described with reference to the flowchart in FIG. 29.

The image decoding apparatus 300 initiates the multiview output decoding process upon acquiring a codestream which has been generated by an image encoding apparatus 100. When the multiview output decoding process is initiated, in step S301 the codestream analyzer 301 analyzes the acquired codestream and splits the codestream into pre-merge codestreams for a number of views.

In step S302, the decoders 302 for respective views decode the codestreams according to the progressive structure of the codestreams, and output decoded image data 313. In step S303, the image decoding apparatus 300 determines whether or not the decoding of codestreams has finished for all views, and returns the process to step S302 in the case of determining that there exist views for which decoding has not finished. In the case of determining that the decoding of codestreams has finished for all views, the image decoding apparatus 300 ends the multiview output decoding process.

[Analysis Process Flow]

Next, an exemplary detailed flow of the analysis process executed in step S301 of FIG. 29 will be described with reference to the flowchart in FIG. 30.

When the analysis process is initiated, in step S321 the progression analyzer 321 analyzes progression information added to a codestream and ascertains the progressive structure and number of views, etc. in the codestream.

In step S322, the splitter 322 splits the codestream into individual views according to the progressive structure of the codestream which as analyzed by the processing in step S321.

In step S323, the progression information generator 323 respectively generates and adds progression information to the split codestreams for respective views.

In step S324, the progression information generator 323 outputs codestreams for respective views with added progression information.

Figure 29:
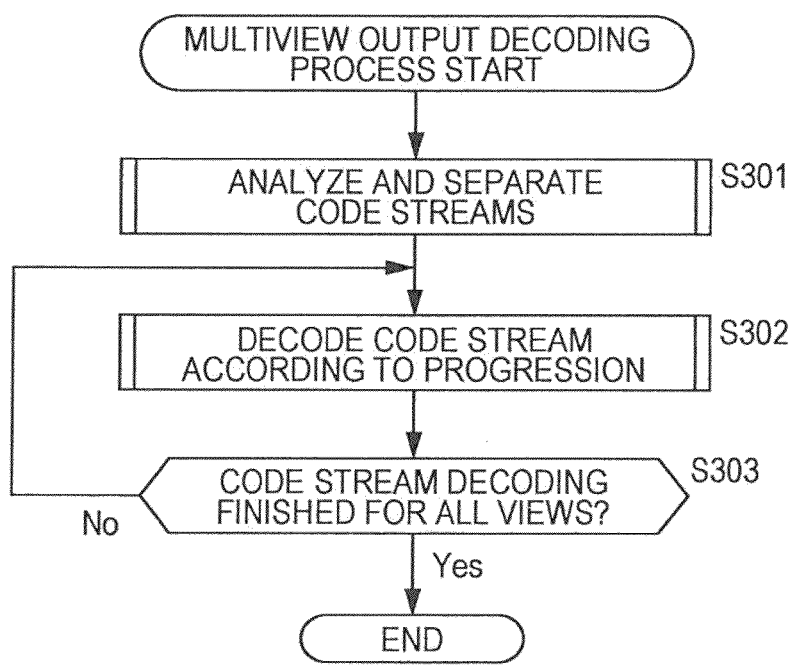
FIG. 29 is a flowchart explaining an exemplary flow of a multi-output decoding process.
Figure 30:
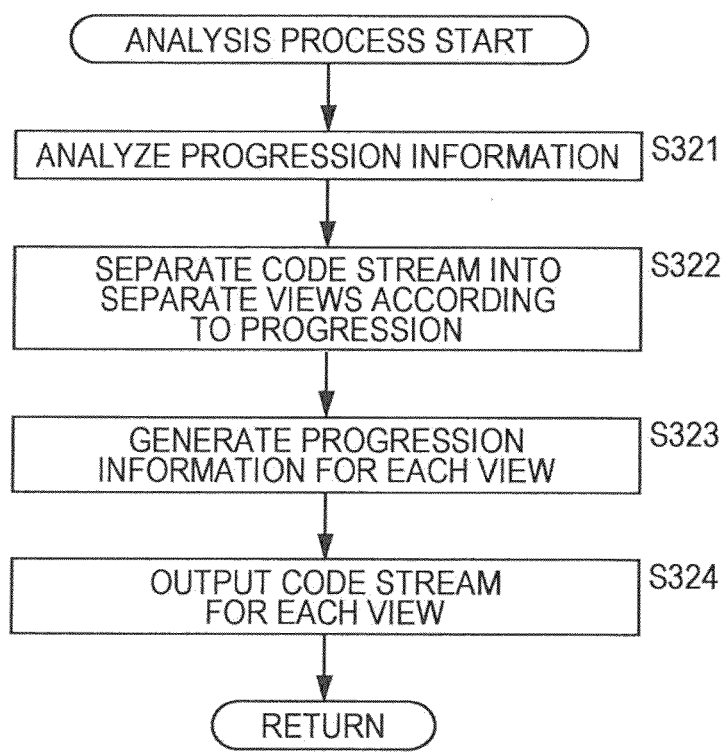
FIG. 30 is a flowchart explaining an exemplary flow of an analysis process.

When the processing in step S324 ends, the codestream analyzer 301 ends the analysis process, returns the process to step S301 of FIG. 29, and causes the processing in step S302 and thereafter to be executed.

[Decoding Process Flow]

Figure 31:
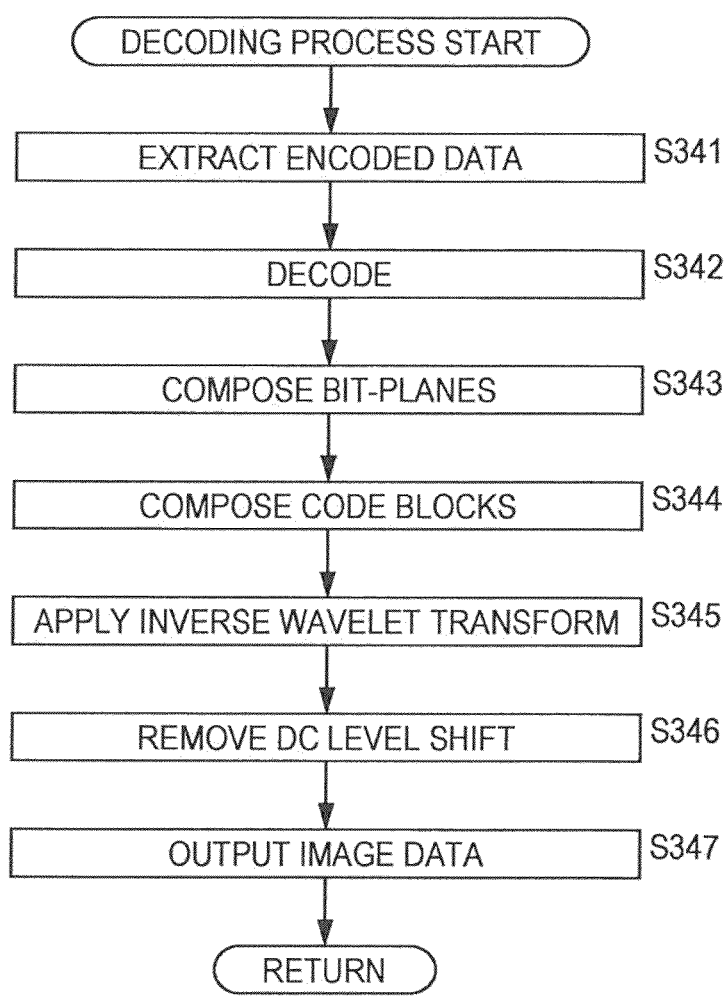
FIG. 31 is a flowchart explaining an exemplary flow of a decoding process.

Next, an exemplary detailed flow of the decoding process executed in step S302 of FIG. 29 will be described with reference to the flowchart in FIG. 31.

When the decoding process is initiated, in step S341 the packet decrypter 351 extracts encoded data from acquired packets.

In step S342, the EBCOT unit 371 decodes the encoded data which was extracted in step S341. In step S343, the bitplane composer 354 composes the bitplanes of coefficient data obtained by the decoding, and generates coefficient data for individual code-blocks. In step S344, the code-block composer 355 composes the code-blocks of coefficient data for individual code-blocks, and generates coefficient data for individual subbands.

In step S345, the inverse wavelet transform unit 356 applies an inverse wavelet transform to the coefficient data for individual subbands and generates baseband image data. Meanwhile, in the case where the coefficient data has been quantized in the image encoding apparatus 100, dequantization corresponding to such quantization is first conducted on the coefficient data and then the inverse wavelet transform is applied.

In step S346, the DC level shift remover 357 removes the DC level shift in the baseband image data obtained by the inverse wavelet transform.

In step S347, the decoders 302 output image data which has been subjected to the DC level shift removal process from the output views 368 as decoded image data. For example, the decoded image data may be output to a display not illustrated, for example, and an image thereof may be displayed.

When the processing in step S347 ends, the decoders 302 end the decoding process. The decoders 302 repeat such a decoding process over individual decoding process units. Since the respective encoded data in the codestream is arrayed in an order according to a progressive structure, the decoders 302 are able to easily decode the codestream in an order following the progressive structure by sequentially decoding supplied encoded data according to progression information.

As above, an image decoding apparatus 300 is able to decode according to a progressive structure, i.e., a data structure for realizing decoded image scalability, and generate multiview decoded image data by analyzing progression information added to a codestream. In other words, an image decoding apparatus 300 is able to suitably decode a codestream which has been generated by an image encoding apparatus 100, and realize decoded image scalability. Consequently, an image decoding apparatus 300 is able to improve the convenience of codestreams in which multiview images are encoded.

3. Third Embodiment

[Image Encoding Apparatus Configuration]

Although 3D video enabling stereoscopic viewing of images has been proliferating recently, stereo image formats utilizing binocular parallax prevail. However, stereoscopic viewing from arbitrary directions cannot be realized with binocular parallax-based stereoscopic viewing using such stereo images. Thus, methods using depth data (a depth_map), which indicates the depths of respective parts of a subject image, have been considered.

Methods that extract such depth data from multiview image data are being considered. In other words, given subjects are shot from a plurality of directions, and the depths of the subjects are computed from the positional differences of the subjects in the shot images. According to such a method, depths are computed for all subjects in the shot images, and depth data is generated.

Since the depths of subjects are identifiable by using such depth data, binocular parallax can be computed from arbitrary viewpoints on the basis of this information. In other words, stereo images from arbitrary viewpoints can be generated.

It may be configured such that such depth data is encoded as a view together with image data to make a single codestream having a progressive structure as discussed earlier.

In other words, although the case of encoding multiview images and generating a single codestream was described in the first embodiment, the present invention may also be applied to the case where such depth data is also encoded as input for one view to make a single codestream having a progressive structure.

Figure 32:
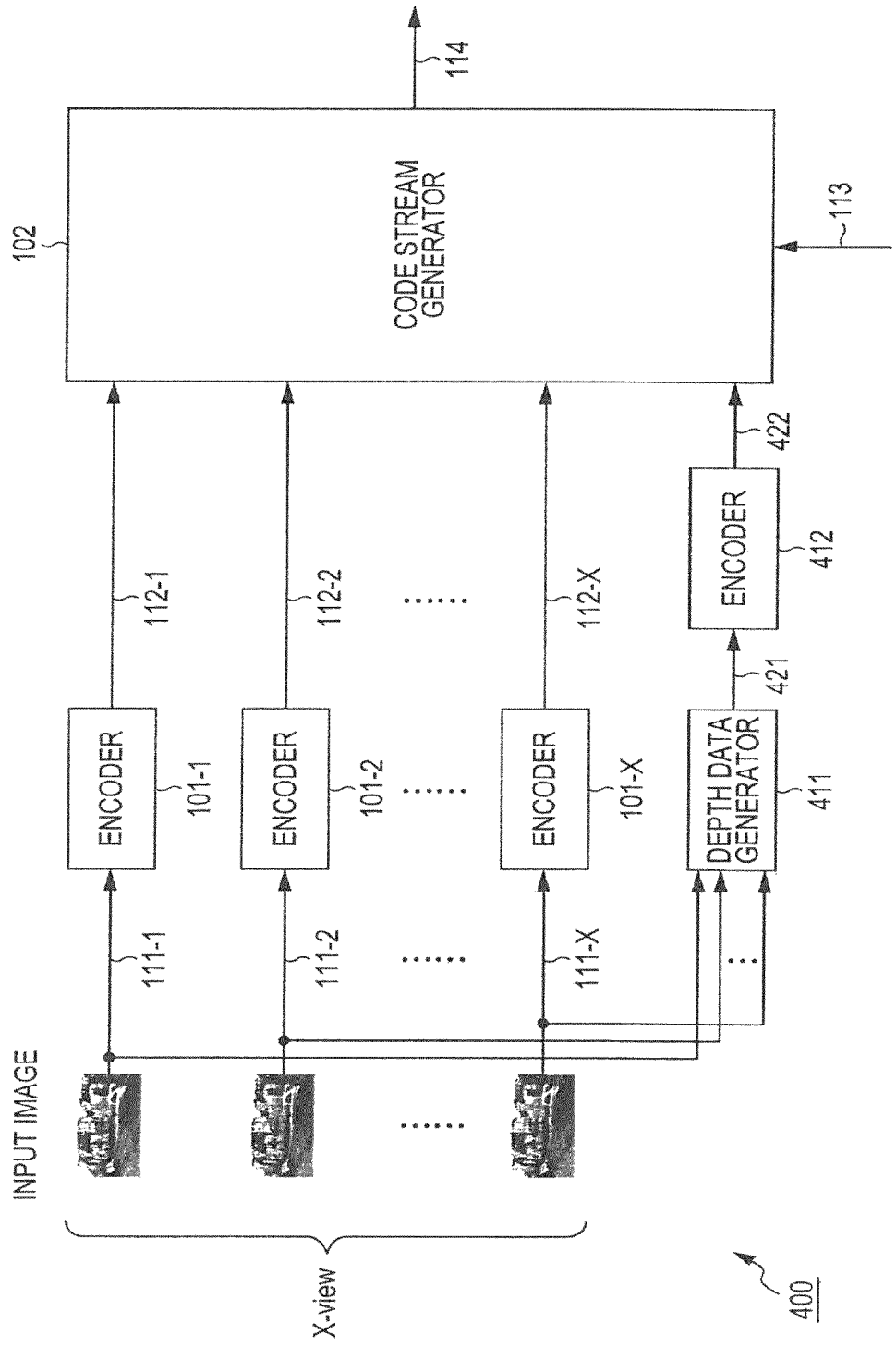
FIG. 32 is a block diagram illustrating an exemplary primary configuration of an image encoding apparatus to which the present invention has been applied.

FIG. 32 is a block diagram illustrating an exemplary configuration of an image encoding apparatus for this case. In FIG. 32, the same numbers are given to parts of the configuration which are similar to the image encoding apparatus 100 in FIG. 1. In FIG. 32, the image encoding apparatus 400 basically has a configuration similar to the image encoding apparatus 100, but additionally includes a depth data generator 411 and an encoder 412.

However, in this case, the input image data 111 for respective input views are images in which approximately the same subjects have been shot or rendered from different directions, or in other words, are images constituting multiview.

The depth data generator 411 uses the respective input image data 111 to generate depth data 421 expressing the depths of subjects in the images. The method of computing the depths of subjects is arbitrary.

Figure 33:
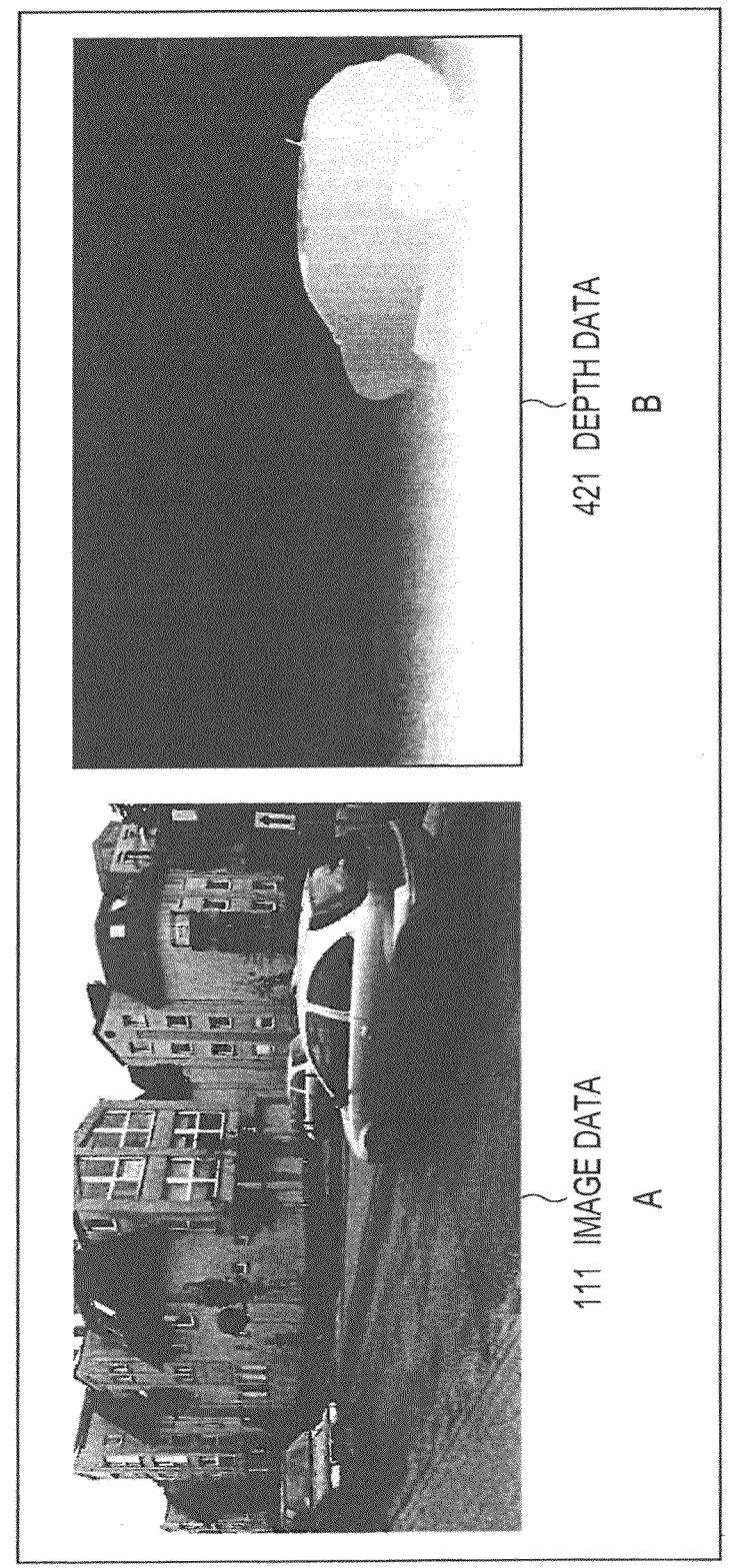
FIG. 33 is a diagram explaining exemplary depth data.

FIG. 33 illustrates exemplary depth data. Exemplary depth data for the image data 111 illustrated by A in FIG. 33 is illustrated by B in FIG. 33. As illustrated by B in FIG. 33, the depth data 421 is information indicating the depths of the entire area of the input image data 111 with a given number of bits per a given range, such as per pixel or per block, for example. In other words, the depth data 421 typically may be expressed as grayscale bitmap data. The number of gradations in this bitmap data is the bit depth of the depth data 421 (or in other words, the expressiveness of the depth).

Consequently, the depth data may be encoded in a basically similar manner to other input image data 111. Returning to FIG. 32, the depth data generator 411 supplies generated depth data 421 to the encoder 412. The encoder 412 has a configuration similar to the encoders 101 and conducts similar processing. In other words, the encoder 412 encodes depth data 421 similarly to the encoders 101 and generates a codestream 422 having a progressive structure like that of JPEG 2000. The encoder 412 supplies the generated codestream 422 to the codestream generator 102.

In other words, when viewed from the codestream generator 102, the input has increased by one view (X+1), but the number of input views X is arbitrary to begin with. In other words, the codestream generator 102 merges the codestreams for respective views similarly to the case of the first embodiment and generates a single codestream 114 having a progressive structure to which a progressive structure for multiview has been added.

However, it may also be configured such that depth data is generated externally to the image encoding apparatus 400. The image encoding apparatus 400 in this case has a configuration similar to the image encoding apparatus 100 in FIG. 1. In other words, when image data and depth data are input, they can be encoded by the image encoding apparatus 100.

[Multiview Input Encoding Process Flow]

Next, exemplary flows of a multiview input encoding process executed by the image encoding apparatus 400 will be described with reference to the flowchart in FIG. 34. This process corresponds to the flowchart in FIG. 23.

Figure 34:
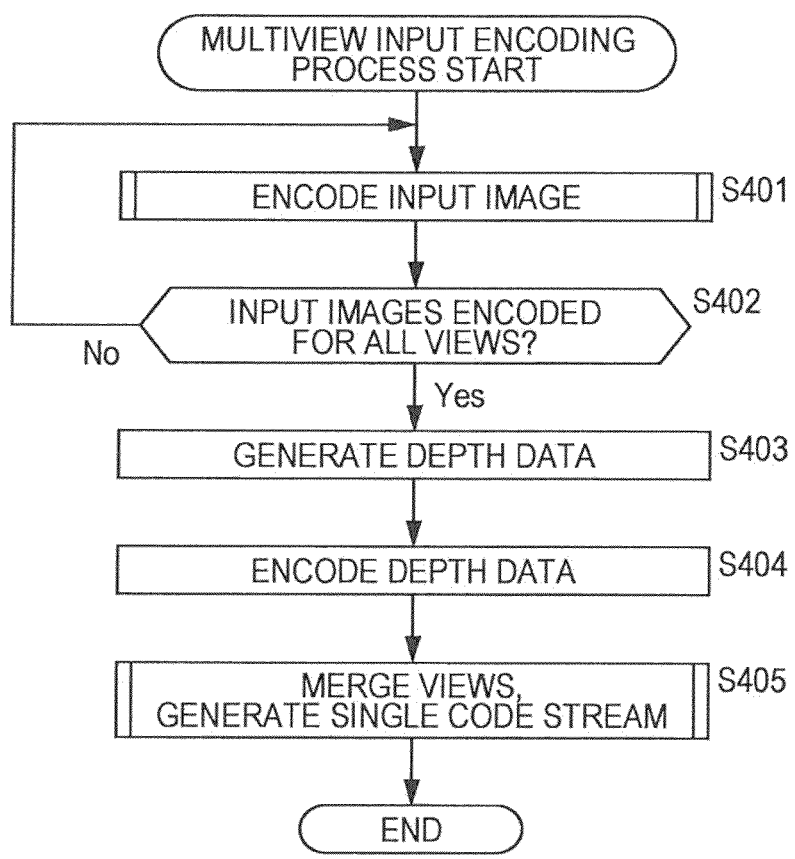
FIG. 34 is a flowchart explaining another exemplary flow of a multi-input encoding process.

In other words, the respective processing of step S401, and step S402 in FIG. 34 is executed similarly to that of step S101 and step S102 in FIG. 23.

In step S403, the depth data generator 411 generates depth data from the input image data 111 for respective views. In step S404, the encoder 412 encodes the depth data similarly to the case of step S401.

In step S405, the codestream generator 102 merges the codestreams generated in step S401 and the codestream generated in step S404 similarly to the case of step S103 in FIG. 23, and generates a single codestream having a progressive structure.

When the processing in step S405 ends, the image encoding apparatus 400 ends the multiview input encoding process.

In this way, the image encoding apparatus 400 is able to generate depth data from plural input image data constituting multiview, encode the depth data together with the input image data for the respective views, and generate a single codestream having a progressive structure.

In other words, the image encoding apparatus 400 is able to improve the convenience of codestreams in which multiview images are encoded, even in the case where depth data is included in this way.

Meanwhile, at the decoding side, depth data may be processed as the image data (bitmap data) of one view. In other words, an image decoding apparatus 300 described in the second embodiment is also able to decode a codestream 114 generated by the image encoding apparatus 400, similarly to a codestream 114 generated by the image encoding apparatus 100.

4. Fourth Embodiment

[Network System Configuration]

It may also be configured such that a codestream generated by an image encoding apparatus 100 or an image encoding apparatus 400 described in the foregoing is transferred to an image decoding apparatus 300 by an arbitrary method. For example, it may also be configured such that an image encoding apparatus 100 or an image encoding apparatus 400 records a generated codestream to an arbitrary recording medium, such as a Blu-Ray Disc, flash memory, or a hard disk, and an image decoding apparatus 300 reads out the codestream from the recording medium and decodes it.

Also, it may be configured such that an image encoding apparatus 100 or an image encoding apparatus 400 transmits a generated codestream to an image decoding apparatus 300 via an arbitrary communication medium, such as a wired or wireless network.

Furthermore, although in the foregoing the codestream generator 102 in the image encoding apparatus 100 and the image encoding apparatus 400 was described as acquiring external instructions 113 regarding a progressive structure, the source providing such instructions is arbitrary. For example, it may be configured such that instructions are supplied by a user or another apparatus as discussed earlier. It may also be configured such that instructions are supplied from an image decoding apparatus that decodes a codestream generated by an image encoding apparatus.

Figure 35:
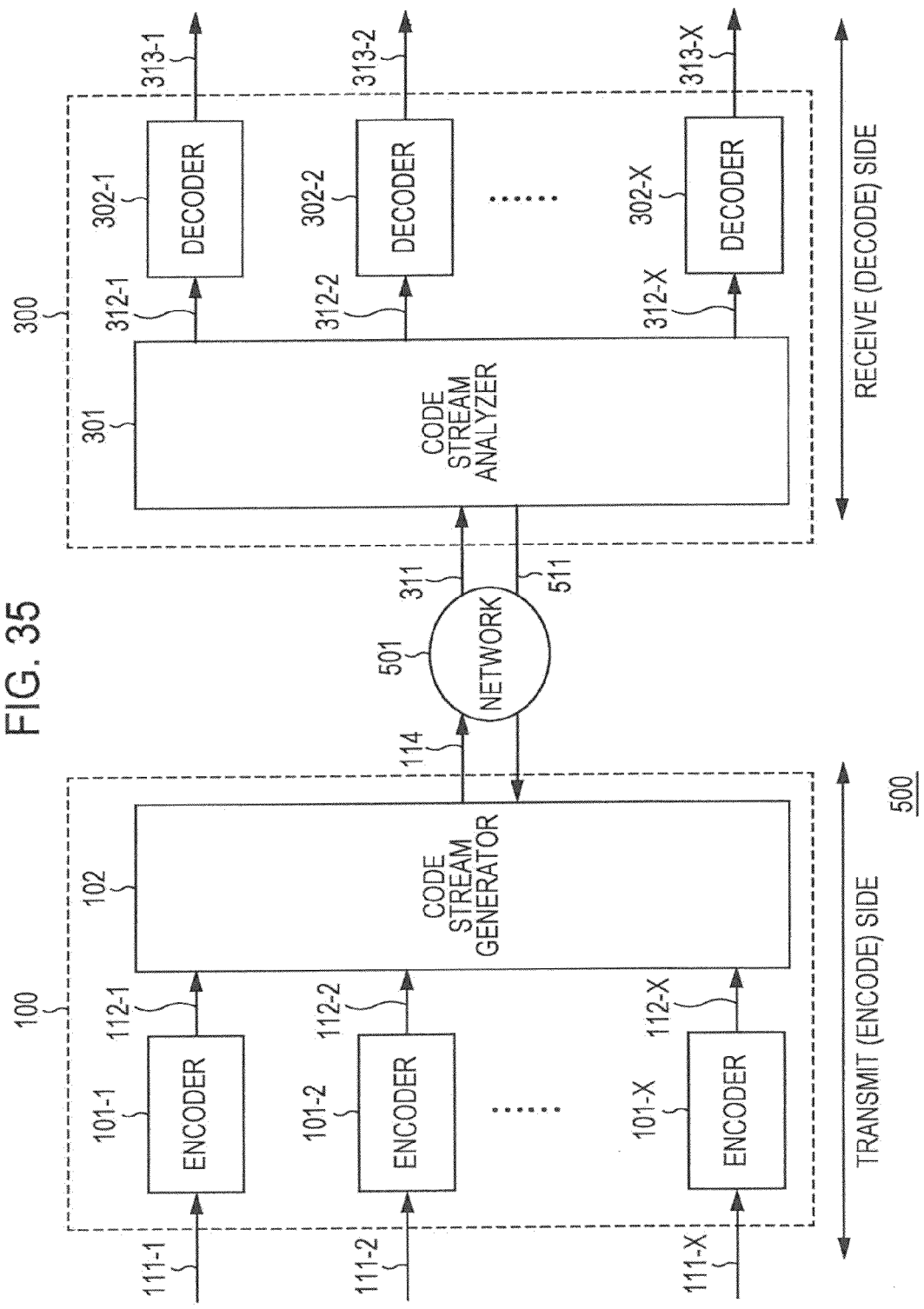
FIG. 35 is a diagram explaining an exemplary primary configuration of a network system to which the present invention has been applied.

FIG. 35 is block diagram illustrating an exemplary configuration of a network system to which the present invention has been applied.

The network system 500 illustrated in FIG. 35 is a system that transmits multiview image data from an encoding side to a decoding side via a network 501. When so doing, the network system 500 encodes and bundles multiview image data at the transmit side in order to reduce the amount of bandwidth used during transmission, transmits it as a single codestream, and decodes and obtains the original multiview decoded image data at the receive side.

The network 501 is composed of an arbitrary communication medium. For example, the network 501 may be composed of an arbitrary network as typified by the Internet or a LAN, etc. The network 501 may be a single network or a collection of multiple networks. Consequently, the network 501 may be configured to include relays or other arbitrary communication devices besides the cables, or other communication medium. Also, the network 501 may be a wired network or a wireless network, and may also be configured to be a mixture of wired and wireless topologies.

The network system 500 includes the image encoding apparatus 100 discussed earlier as an encoding apparatus on the transmit side. Also, the network system 500 includes the image decoding apparatus 300 discussed earlier as a decoding apparatus on the receive side.

In other words, the image encoding apparatus 100 on the transmit side encodes multiview image data to be transmitted, generates a single codestream 114 having a progressive structure, and transmits it to the image decoding apparatus 300 via the network 501.

The image decoding apparatus 300 on the receive side receives it as a codestream 311, decodes and splits the codestream into the original multiview image data and outputs the result.

Also, the image decoding apparatus 300 supplies instructions 511 regarding a progressive structure to the image encoding apparatus 100 via the network 501 on the basis of the image data usage method, etc. The codestream generator 102 of the image encoding apparatus 100 receives them as external instructions 113.

By configuring in this way, the image encoding apparatus 100 is able to easily generate a codestream with a progressive structure in accordance with its application on the receive (decode) side. In other words, the network system 500 is able to improve the convenience of codestreams in which multiview images are encoded.

However, it may also be configured such that instructions regarding a progressive structure are issued (provided to the image encoding apparatus 100) by an apparatus other than the image decoding apparatus 300. For example, a control center or intermediate hub included in the network 501 may issue instructions on the basis of the bandwidth or congestion conditions of the network 501, etc.

Furthermore note that since it is sufficient to configure a codestream so as to have a progressive structure, the image data encoding format is not limited to the JPEG 2000 format.

5. Fifth Embodiment

[Personal Computer]

The foregoing series of processes may be executed in hardware, but may also be executed in software. In this case, an embodiment may also be configured as a personal computer like that illustrated in FIG. 36, for example.

Figure 36:
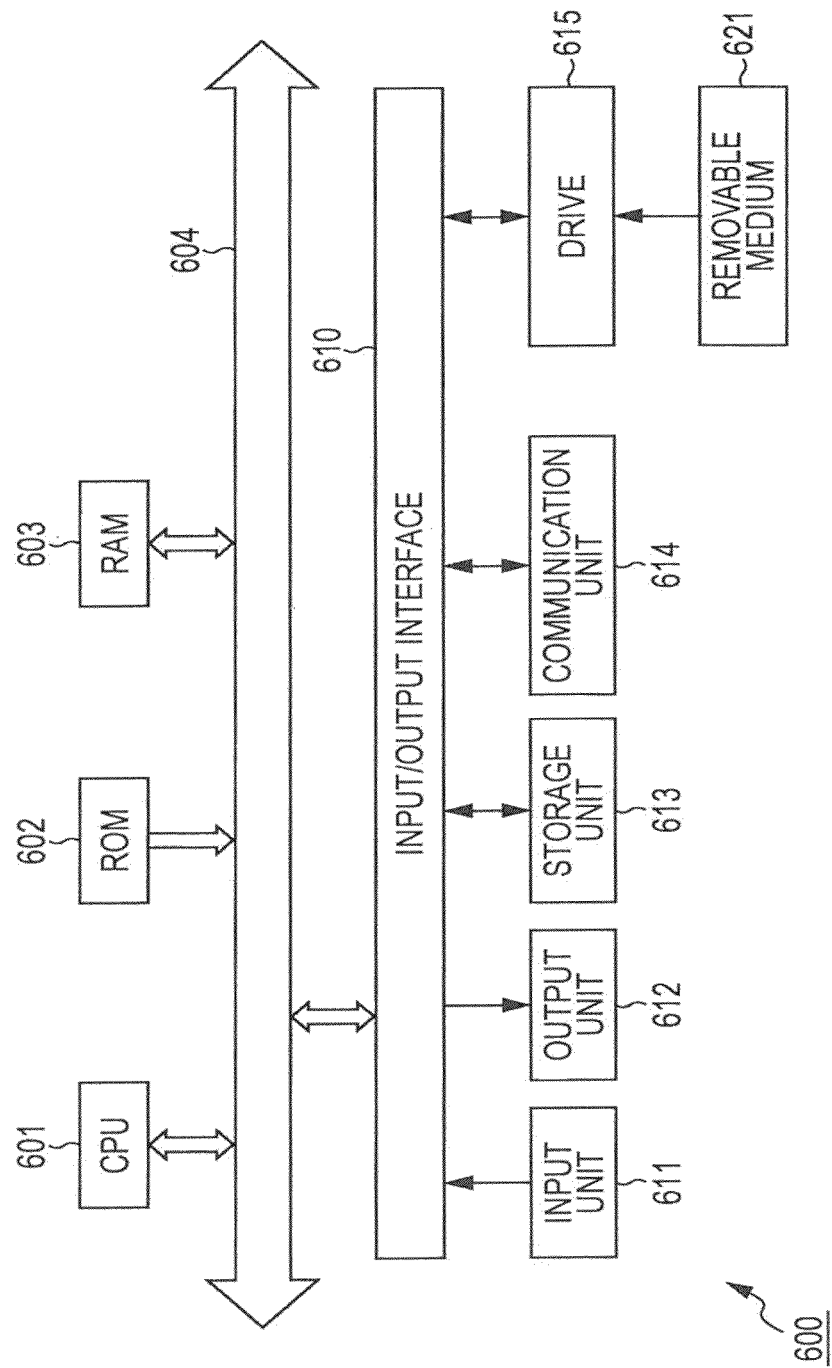
FIG. 36 is a block diagram illustrating an exemplary configuration of a personal computer to which the present invention has been applied.

In FIG. 36, the central processing unit (CPU) 601 of a personal computer 600 executes various processes by following a program stored in read-only memory (ROM) 602 or a program which has been loaded into random access memory (RAM) 603 from a storage unit 613. The RAM 603 may also store other information as appropriate, such as data required for the CPU 601 to execute various processes.

The CPU 601, ROM 602, and RAM 603 are connected to each other via a bus 604. An input/output interface 610 is also connected to the bus 604.

Also connected to the input/output interface 610 are an input unit 611 comprising a keyboard, mouse, etc., an output unit 612 comprising a display such as a cathode ray tube (CRT) display or liquid crystal display (LCD) display as well as speakers, etc., a storage unit 613 comprising a flash memory or other solid-state drive (SSD), a hard disk, etc., and a communication unit 614 comprising a wired local area network (LAN) or wireless LAN interface, modem, etc. The communication unit 614 conducts communication processes via networks, including the Internet.

A drive 615 may also be connected to the input/output interface 610 as necessary, into which a removable medium 621 such as a magnetic disk, optical disc, magneto-optical disc, or semiconductor memory is suitably loaded. Computer programs read out from such media are installed to the storage unit 613 as necessary.

In the case of executing the foregoing series of processes in software, a program constituting such software is installed from a network or a recording medium.

This recording medium may consist of a removable medium 621 comprising a magnetic disk (including a flexible disk), an optical disc (including a Compact Disc-Read-Only Memory (CD-ROM) and a Digital Versatile Disc (DVD)), a magneto-optical disc (including a MiniDisc (MD)), or semiconductor memory, onto which the program is recorded and which is distributed separately from the main apparatus in order to deliver the program to users, as illustrated in FIG. 36, for example. Furthermore, this recording medium may consist of the ROM 602 or a hard disk included in the storage unit 613, onto which the program is recorded and which is delivered to the user already built into the main apparatus.

Meanwhile, a program executed by the computer may be a program in which processes are conducted in a time series following the order described in this specification, but may also be a program in which processes are conducted in parallel or at necessary timings, such as when called.

Also, in this specification, the steps stating a program recorded to a recording medium may obviously include processes conducted in a time series following the described order, but may also include processes executed in parallel or individually without necessarily being processed in a time series.

Also, in this specification, a system is a term expressing the totality of an apparatus composed of a plurality of devices (apparatus).

Also, configurations described as a single apparatus (or processor) in the foregoing may also be configured as a plurality of apparatus (or processors). Likewise, configurations described as a plurality of apparatus (or processors) in the foregoing may also be configured as a single, unified apparatus (or processor). Also, it may obviously be configured such that elements other than those discussed in the foregoing are added to the configurations of respective apparatus (or respective processors). Furthermore, it may also be configured such that part of the configuration of a given apparatus (or processor) is included in the configuration of another apparatus (or processor), as long as the configuration and operation of the system as a whole is substantially the same. In other words, embodiments of the present invention are not limited to the embodiments discussed earlier, and various modifications are possible within a scope that does not depart from the principal matter of the present invention.

For example, it may be configured such that the codestream generator 102 in FIG. 1 is an independent apparatus which accepts multiple codestreams, merges them, and outputs them as a single codestream having a progressive structure.

The present invention may be applied to a 3D digital cinema editing apparatus, a 3D archive system, a 3D image transmitting apparatus at a broadcasting station, a 3D image database, a 3D medical image recording system, a 3D game console, a television receiver system, a 3D-compatible Blu-Ray Disc recorder or player, a free viewpoint television, a telepresence videoconferencing system, or an authoring tool installed to a personal computer or a software module therefor, for example.

REFERENCE SIGNS LIST 100 image encoding apparatus
101 encoders
102 codestream generator
181 progression analyzer
182 instructions receiver
183 progression determining unit
184 merging unit
185 progression information generator
300 image decoding apparatus
301 codestream analyzer
302 decoders
321 progression analyzer
322 splitter
323 progression information generator
400 image encoding apparatus
411 depth data generator
412 encoders
500 network system
501 network

The invention claimed is:

1. An image processing apparatus, comprising:
   an input for images encoded in multiview codestreams having a tiered progressive structure of layers, resolution levels, component and positions;
   analyzing means for analyzing a progressive structure, i.e. a data structure for realizing decoded image scalability of the multiview codestreams;
   determining means for determining a merged progressive structure for the multiview codestreams according to analysis results of the analyzing means; and
   merging means for merging the multiview codestreams according to the merged progressive structure determined by the determining means, and generating a single codestream having the progressive structure.

2. The image processing apparatus according to claim 1, wherein
   the determining means determines the merged progressive structure such that a progressive structure with respect to views is added to the progressive structure analyzed by the analyzing means.

3. The image processing apparatus according to claim 2, wherein
   in the case where the progressive structure analyzed by the analyzing means has a tiered structure in the order of layers, resolution levels, components, and positions, the determining means takes the merged progressive structure to be a tiered structure in the order of views, layers, resolution levels, components, and positions.

4. The image processing apparatus according to claim 2, wherein
   in the case where the progressive structure analyzed by the analyzing means has a tiered structure in the order of layers, resolution levels, components, and positions, the determining means takes the merged progressive structure to be a tiered structure in the order of layers, views, resolution levels, components, and positions.

5. The image processing apparatus according to claim 2, wherein
   in the case where the progressive structure analyzed by the analyzing means has a tiered structure in the order of resolution levels, layers, components, and positions, the determining means takes the merged progressive structure to be a tiered structure in the order of views, resolution levels, layers, components, and positions.

6. The image processing apparatus according to claim 2, wherein
   in the case where the progressive structure analyzed by the analyzing means has a tiered structure in the order of resolution levels, layers, components, and positions, the determining means takes the merged progressive structure to be a tiered structure in the order of resolution levels, views, layers, components, and positions.

7. The image processing apparatus according to claim 2, wherein
in the case where the progressive structure analyzed by the analyzing means has a tiered structure in the order of resolution levels, positions, components, and layers, the determining means takes the merged progressive structure to be a tiered structure in the order of views, resolution levels, positions, components, and layers.

8. The image processing apparatus according to claim 2, wherein
in the case where the progressive structure analyzed by the analyzing means has a tiered structure in the order of resolution levels, positions, components, and layers, the determining means takes the merged progressive structure to be a tiered structure in the order of resolution levels, positions, views, components, and layers.

9. The image processing apparatus according to claim 2, wherein
in the case where the progressive structure analyzed by the analyzing means has a tiered structure in the order of positions, components, resolution levels, and layers, and positions, the determining means takes the merged progressive structure to be a tiered structure in the order of views, positions, components, resolution levels, and layers.

10. The image processing apparatus according to claim 2, wherein
in the case where the progressive structure analyzed by the analyzing means has a tiered structure in the order of positions, components, resolution levels, and layers, the determining means takes the merged progressive structure to be a tiered structure in the order of positions, views, components, resolution levels, and layers.

11. The image processing apparatus according to claim 2, wherein
in the case where the progressive structure analyzed by the analyzing means has a tiered structure in the order of components, positions, resolution levels, and layers, the determining means takes the merged progressive structure to be a tiered structure in the order of views, components, positions, resolution levels, and layers.

12. The image processing apparatus according to claim 2, wherein
in the case where the progressive structure analyzed by the analyzing means has a tiered structure in the order of components, positions, resolution levels, and layers, the determining means takes the merged progressive structure to be a tiered structure in the order of components, views, positions, resolution levels, and layers.

13. The image processing apparatus according to claim 1, further comprising:
progression information generating means for generating progression information regarding the merged progressive structure, and adding it to the codestream.

14. The image processing apparatus according to claim 13, wherein
the progression information generating means defines as the progression information a tiered structure for the merged progressive structure in at least one of SGcod, SPcoc, and Ppoc in a JPEG 2000 COD marker segment included in the merged codestream.

15. The image processing apparatus according to claim 13, wherein
the progression information generating means defines as the progression information the number of views in the codestreams merged by the merging means in Rsiz in a JPEG 2000 SIZ marker segment included in the merged codestream.

16. The image processing apparatus according to claim 1, further comprising:
instructions receiving means for receiving external instructions regarding the progressive structure;
wherein
the determining means determines the merged progressive structure according to analysis results of the analyzing means and the external instructions received by the instructions receiving means.

17. The image processing apparatus according to claim 1, further comprising:
encoding means for encoding the images for respective views so as to have the progressive structure;
wherein
the analyzing means analyzes the progressive structure of the codestreams for respective views which have been generated by the encoding means encoding the images.

18. The image processing apparatus according to claim 17, further comprising:
depth data generating means for generating depth data indicating image depths from the images for respective views;
wherein
the encoding means additionally encodes the depth data generated by the depth data generating means, and
the merging means merges a codestream of the depth data generated by the encoding means together with other multiview codestreams as a single codestream.

19. An image processing method for an image processing apparatus, comprising:
receiving images encoded in multiview codestreams having a tiered progressive structure of layers, resolution levels, component and positions;
analyzing a progressive structure, i.e. a data structure for realizing decoded image scalability of the multiview codestreams;
determining a merged progressive structure for the multiview codestreams according to analysis results; and
merging the multiview codestreams according to the determined merged progressive structure, and generating a single codestream having the progressive structure.

20. An image processing apparatus, comprising:
analyzing means for analyzing a progressive structure, i.e. a data structure for realizing decoded image scalability of a single codestream which has been generated by merging multiview codestreams in which images are encoded in said multiview codestreams having a tiered progressive structure of layers, resolution levels, component and positions; and
splitting means for splitting the merged, single codestream into the multiview codestreams according to a progressive structure with respect to views which is included in the progressive structure analyzed by the analyzing means.

21. The image processing apparatus according to claim 20, further comprising:
decoding means for decoding the codestreams for respective views which have been split by the splitting means.

22. The image processing apparatus according to claim 20, further comprising:
progression information generating means for generating progression information, i.e. information regarding the progressive structure, for the codestreams for respective views which have been split by the splitting means, and adding it to the codestreams.

23. The image processing apparatus according to claim 20, wherein the merged, single codestream has a progressive structure with respect to views, layers, resolution levels, components, and positions.

24. An image processing method for an image processing apparatus, comprising:

analyzing a progressive structure, i.e. a data structure for realizing decoded image scalability of a single codestream which has been generated by merging multiview codestreams in which images are encoded in said multiview codestreams having a tiered progressive structure of layers, resolution levels, component and positions; and splitting the merged, single codestream into the multiview codestreams according to a progressive structure with respect to views which is included in the analyzed progressive structure.

* * * * *